US012794883B2

(12) United States Patent
Nishida et al.

(10) Patent No.: US 12,794,883 B2
(45) Date of Patent: Nov. 10, 2026

(54) BIOMETRIC AUTHENTICATION USING SECRET STATES IN SECURE COMPUTATION

(71) Applicant: Panasonic Intellectual Property Management Co., Ltd., Osaka (JP)

(72) Inventors: Naohisa Nishida, Kanagawa (JP); Tatsumi Oba, Chiba (JP); Yuji Unagami, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 19/261,386

(22) Filed: Jul. 7, 2025

(65) Prior Publication Data

US 2025/0337737 A1 Oct. 30, 2025

Related U.S. Application Data

(63) Continuation of application No. PCT/JP2023/039267, filed on Oct. 31, 2023.

(Continued)

(30) Foreign Application Priority Data

Jun. 27, 2023 (JP) ................................ 2023-105484

(51) Int. Cl.
*G06F 21/00* (2013.01)
*H04L 9/40* (2022.01)

(52) U.S. Cl.
CPC ................................ *H04L 63/0861* (2013.01)

(58) Field of Classification Search
CPC ....... H04L 63/0861; G06F 21/32; G06F 21/60
See application file for complete search history.

(56) References Cited

U.S. PATENT DOCUMENTS

2012/0239940 A1* 9/2012 Chabanne ............... G06F 21/32 713/186
2013/0159192 A1* 6/2013 Partridge ............... G06Q 30/02 705/14.1

(Continued)

FOREIGN PATENT DOCUMENTS

JP 2019-215512 12/2019
WO 2021/070838 4/2021

OTHER PUBLICATIONS

Huang et al., "Privacy-Preserving Approximate Nearest Neighbor Search: A Construction and Experimental Results", Computer Security Symposium 2019, Oct. 21-24, 2019, pp. 297-304.

(Continued)

*Primary Examiner* — William A Corum, Jr.
(74) *Attorney, Agent, or Firm* — Greenblum & Bernstein, P.L.C.

(57) ABSTRACT

An authentication method includes: computing, in a secret state, a hash value from a first feature value of the biometric information, using a hash function; converting the hash value from a first integer share to a binary share; computing, in a secret state, an XOR bit sequence by performing an exclusive OR operation between the hash value and a registered hash value; converting the XOR bit sequence from the binary share to a second integer share; computing, in a secret state, a total of a plurality of bit values present in the XOR bit sequence; and determining, using the Hamming distance, whether a registered feature value is to be used in authentication processing.

14 Claims, 32 Drawing Sheets

Related U.S. Application Data

(60) Provisional application No. 63/438,156, filed on Jan. 10, 2023.

(56) References Cited

U.S. PATENT DOCUMENTS

| | | | | |
|---|---|---|---|---|
| 2014/0337634 | A1* | 11/2014 | Starner | H04W 12/33<br>713/186 |
| 2018/0052904 | A1* | 2/2018 | Fusco | G06F 16/9535 |
| 2019/0114530 | A1 | 4/2019 | Nishida et al. | |
| 2019/0171665 | A1* | 6/2019 | Navlakha | G06V 10/761 |
| 2021/0019556 | A1* | 1/2021 | Ganguly | G06F 18/24137 |
| 2021/0319134 | A1* | 10/2021 | Kåberg Johard | G06F 21/32 |
| 2022/0100897 | A1 | 3/2022 | Nishida et al. | |
| 2022/0391947 | A1* | 12/2022 | Kleber | G06F 16/951 |

OTHER PUBLICATIONS

International Search Report issued in International Pat. Appl. No. PCT/JP2023/039267, dated Jan. 9, 2024, along with an English translation thereof.

* cited by examiner

FIG. 11

| Secret user ID | Secret hash value | Secret feature value |
|---|---|---|
| Secret user ID | Secret hash value | Secret feature value |
| Secret user ID | Secret hash value | Secret feature value |
| 0xAAA | 0b00001111 | 0x55555555 |
| 0xBBB | 0b00110011 | 0x66666666 |
| 0xCCC | 0b00110010 | 0x77777777 |

BIOMETRIC AUTHENTICATION USING SECRET STATES IN SECURE COMPUTATION

CROSS REFERENCE TO RELATED APPLICATIONS

This is a continuation application of PCT International Application No. PCT/JP2023/039267 filed on Oct. 31, 2023, designating the United States of America, which is based on and claims priority of U.S. Provisional Patent Application No. 63/438,156 filed on Jan. 10, 2023, and Japanese Patent Application No. 2023-105484 filed on Jun. 27, 2023. The entire disclosures of the above-identified applications, including the specifications, drawings and claims are incorporated herein by reference in their entirety.

FIELD

The present disclosure relates to an authentication method in which an authentication system performs authentication processing on biometric information in a secret state using a secure computation based on a secret sharing scheme, and the like.

BACKGROUND

Non-Patent Literature (NPL) 1 provides an example of technology related to secret sharing. NPL 1 proposes using a Nearest Neighbor Search to protect privacy.

CITATION LIST

Non Patent Literature

NPL 1: "Privacy-Preserving Approximate Nearest Neighbor Search: A Construction and Experimental Results", Computer Security Symposium 2019

SUMMARY

Technical Problem

However, in secure computations based on a secret sharing scheme, computations are performed while a plurality of computing devices communicate cooperatively with each other, and the computations therefore take time. Authentication processing performed using such secure computations therefore also takes time.

Accordingly, an authentication method and the like are provided in which authentication processing performed using a secure computation based on a secret sharing scheme can be accelerated.

Solution to Problem

An authentication method according to one aspect of the present disclosure is an authentication method for an authentication system to perform authentication processing on biometric information in a secret state using a secure computation based on a secret sharing scheme. The authentication method includes: computing, in a secret state, a hash value from a first feature value of the biometric information, using a hash function that preserves locality; converting the hash value from a first integer share that is a share of secret sharing in which a value is distributed using an integer of a first number of bits, to a binary share that is a share of secret sharing in which a value is distributed using a bit; after the hash value is converted, computing, in a secret state, an XOR bit sequence by performing an exclusive OR operation between the hash value and a registered hash value; converting the XOR bit sequence from the binary share to a second integer share that is a share of secret sharing in which a value is distributed using an integer of a second number of bits smaller than the first number of bits; after the XOR bit sequence is converted, computing, in a secret state, a Hamming distance between the hash value and the registered hash value, by computing a total of a plurality of bit values present in the XOR bit sequence; and determining, using the Hamming distance, whether a registered feature value corresponding to the registered hash value is to be used in the authentication processing.

Note that these comprehensive or specific aspects may be realized by a system, a device, a method, an integrated circuit, a computer program, or a non-transitory computer-readable recording medium such as a CD-ROM, or may be implemented by any desired combination of systems, devices, methods, integrated circuits, computer programs, and recording media.

Advantageous Effects

The authentication method and the like according to one aspect of the present disclosure enable authentication processing performed using a secure computation based on a secret sharing scheme to be accelerated.

BRIEF DESCRIPTION OF DRAWINGS

These and other advantages and features will become apparent from the following description thereof taken in conjunction with the accompanying Drawings, by way of non-limiting examples of embodiments disclosed herein.

FIG. 11 is a schematic diagram illustrating a table according to an embodiment.

DESCRIPTION OF EMBODIMENT

Figure 1:
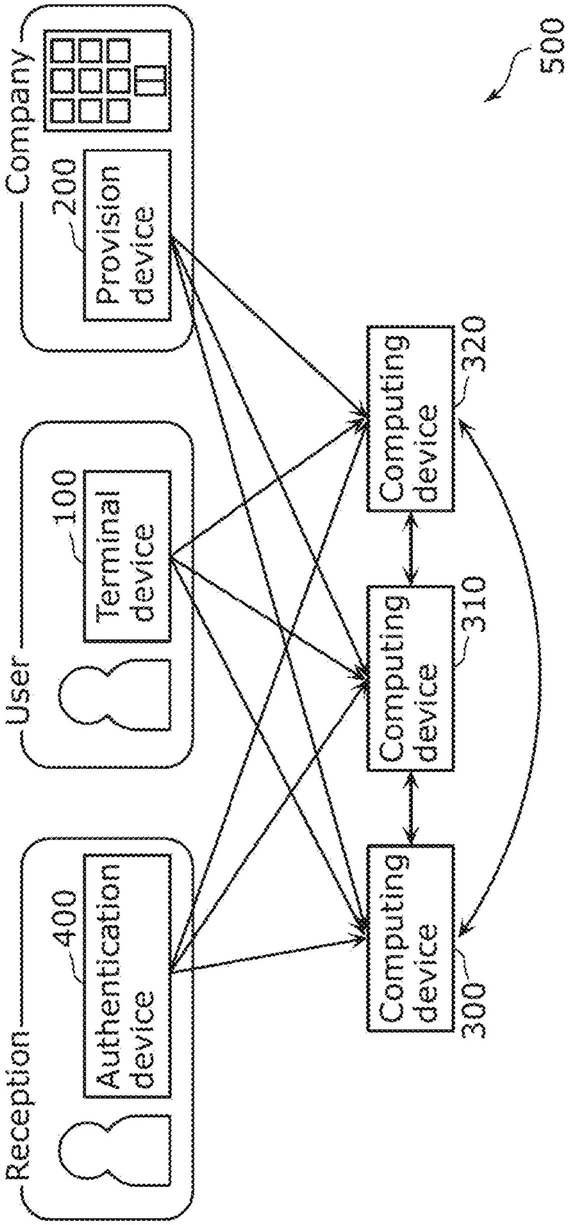
FIG. 1 is a block diagram illustrating the configuration of an authentication system according to an embodiment.

The development of machine learning has made it possible to convert a plurality of face images into a plurality of feature values, and the similarities of a plurality of face images can be computed using a plurality of feature values. Highly-accurate facial recognition has become possible as a result, and a variety of facial recognition services have been proposed.

A face image used for authentication is personal information and should therefore be hidden from anyone other than the person themselves. Face images are also known to be inferred from feature values. As such, in addition to the face image, the feature values should also be hidden from anyone other than the person themselves. Furthermore, a learning model, for example, that converts a face image into feature values used for facial authentication is an asset of the service provider. Such learning models may be misappropriated by being publicized. The learning model should therefore also be hidden.

Accordingly, face images, feature values, and the learning model are kept secret using a secret sharing scheme, for example. Authentication processing is then performed using a secure computation based on a secret sharing scheme, with the face images, feature values, and the learning model kept secret.

In such authentication processing, in a registration phase, a plurality of feature values corresponding to a plurality of face images of a plurality of users are registered in a table in a secret state. Then, in the authentication phase, feature values are derived from the user's face image through the learning model by a secure computation and compared with each of the feature values registered in the table. The authentication processing is therefore performed with the face images, feature values, and learning model kept secret.

On the other hand, in this method, using a secure computation, the feature values derived from the face image are compared to each of the feature values registered in the table. In secure computations based on a secret sharing scheme, computations are performed while a plurality of computing devices communicate cooperatively with each other, and the computations therefore take time. Therefore, the computational cost becomes enormous when using a secure computation to compare the feature values derived from the face image with all the feature values registered in the table.

NPL 1 proposes using a Nearest Neighbor Search to protect privacy. Specifically, a vector is compressed into a Boolean vector having Boolean values as elements using a hash function. The Hamming distance of two Boolean vectors is then computed to compute the distance of two vectors. The Nearest Neighbor Search is therefore performed quickly. Using such a Nearest Neighbor Search may accelerate the authentication processing.

However, in secure computations based on a secret sharing scheme, if, when a plurality of computing devices perform computations while communicating cooperatively with each other, the processing is not sufficiently optimized, the amount of communication increases, which produces processing delay. In secure computations based on a secret sharing scheme, the Nearest Neighbor Search described in NPL 1 may not be efficient enough. There is thus a possibility that authentication processing performed using secure computations based on a secret sharing scheme may not be accelerated to a sufficient degree.

Accordingly, an authentication method of Example 1 according to one aspect of the present disclosure is an authentication method for an authentication system to perform authentication processing on biometric information in a secret state using a secure computation based on a secret sharing scheme. The authentication method includes: computing, in a secret state, a hash value from a first feature value of the biometric information, using a hash function that preserves locality; converting the hash value from a first integer share that is a share of secret sharing in which a value is distributed using an integer of a first number of bits, to a binary share that is a share of secret sharing in which a value is distributed using a bit; after the hash value is converted, computing, in a secret state, an XOR bit sequence by performing an exclusive OR operation between the hash value and a registered hash value; converting the XOR bit sequence from the binary share to a second integer share that is a share of secret sharing in which a value is distributed using an integer of a second number of bits smaller than the first number of bits; after the XOR bit sequence is converted, computing, in a secret state, a Hamming distance between the hash value and the registered hash value, by computing a total of a plurality of bit values present in the XOR bit sequence; and determining, using the Hamming distance, whether a registered feature value corresponding to the registered hash value is to be used in the authentication processing.

This makes it possible to efficiently select registered feature values to be used in the authentication processing. Accordingly, the amount of computation performed in the authentication processing can be reduced. Furthermore, the XOR bit sequence can be computed efficiently using the binary share. Additionally, the total of the plurality of bit values in the XOR bit sequence can be efficiently computed and expressed using the second integer share corresponding to an integer of the second number of bits smaller than the first number of bits. This makes it possible to accelerate the authentication processing.

An authentication method of Example 2 according to one aspect of the present disclosure may be the authentication method of Example 1, wherein the determining includes determining that the registered feature value corresponding to the registered hash value is to be used in the authentication processing when the Hamming distance between the hash value and the registered hash value is included in first M Hamming distances in ascending order among N Hamming distances, each of the N Hamming distances being between the hash value and a corresponding one of N registered hash values including the registered hash value.

This makes it possible to accurately select, as the registered feature value to be used in the authentication processing, the registered feature value corresponding to the registered hash value having a small Hamming distance with respect to the hash value to be processed.

An authentication method of Example 3 according to one aspect of the present disclosure may be the authentication method of Example 1 or 2, further including determining, when the registered feature value is to be used in the authentication processing, whether the authentication processing succeeds or fails using a similarity of the registered feature value to the first feature value or a second feature value obtained from the first feature value.

This makes it possible to accurately determine the success or failure of the authentication processing of the biometric information using the similarity of the registered feature value to the first feature value or the second feature value of the biometric information.

An authentication method of Example 4 according to one aspect of the present disclosure may be the authentication method of any one of Examples 1 to 3, further including taking the Hamming distance out of the secret state, wherein the determining whether the registered feature value is to be used in the authentication processing includes determining whether the registered feature value corresponding to the registered hash value is to be used in the authentication processing using the Hamming distance taken out of the secret state.

This makes it possible to accelerate the processing using the Hamming distance. Accordingly, the processing of determining whether the registered feature value is to be used in the authentication processing using the Hamming distance can be accelerated.

An authentication method of Example 5 according to one aspect of the present disclosure may be the authentication method of Example 3, further including taking the similarity out of the secret state, wherein the determining whether the authentication processing succeeds or fails includes determining whether the authentication processing succeeds or fails using the similarity taken out of the secret state.

This makes it possible to accelerate the processing using the similarity. Accordingly, the processing of determining the success or failure of the authentication processing can be accelerated using the similarity.

An authentication method of Example 6 according to one aspect of the present disclosure may be the authentication method of any one of Examples 1 to 5, wherein the registered hash value is registered having been converted from the first integer share to the binary share.

This makes it possible to omit the processing of converting the registered hash value from the first integer share to the binary share in the authentication phase. This in turn makes it possible to accelerate the authentication processing.

An authentication method of Example 7 according to one aspect of the present disclosure may be the authentication method of any one of Examples 1 to 6, further including: distributing the biometric information using secret sharing; and computing the first feature value to be used in the authentication processing from the biometric information, in a secret state.

This makes it possible to conceal the processing of computing the first feature value to be used in the authentication processing from the biometric information, and makes it possible to more reliably conceal the first feature value to be used in the authentication processing.

An authentication method of Example 8 according to one aspect of the present disclosure may be the authentication method of any one of Examples 1 to 6, further including: computing the first feature value to be used in the authentication processing from the biometric information; and distributing the first feature value using secret sharing.

This makes it possible to quickly compute the first feature value used in the authentication processing from the biometric information, with a secure computation based on the secret sharing scheme. This in turn makes it possible to accelerate the authentication processing.

An authentication method of Example 9 according to one aspect of the present disclosure may be the authentication method of any one of Examples 1 to 6, further including: computing the first feature value from the biometric information; distributing the first feature value using secret sharing; and computing a second feature value to be used in the authentication processing from the first feature value, in a secret state.

This makes it possible to quickly compute the first feature value from the biometric information, without a secure computation based on the secret sharing scheme. This also makes it possible to conceal the processing of computing the second feature value to be used in the authentication processing from the first feature value, and makes it possible to more reliably conceal the second feature value to be used in the authentication processing.

An authentication method of Example 10 according to one aspect of the present disclosure may be the authentication method of Example 3 or Example 5, further including computing the similarity of the registered feature value to the first feature value or the second feature value, using an intermediate value computed from the registered feature value independent of the first feature value or the second feature value and registered.

This makes it possible to compute and register an intermediate value for computing the similarity before the authentication phase, and to compute the similarity in the authentication phase using the intermediate value that has already been computed and registered. This in turn makes it possible to accelerate the authentication processing.

An authentication method of Example 11 according to one aspect of the present disclosure may be the authentication method of any one of Examples 1 to 10, wherein a device to which the biometric information is input in a registration phase of the biometric information and a device to which the biometric information is input in an authentication phase of the biometric information are a same device.

This makes it possible to perform the authentication processing using the same device in the registration phase and the authentication phase. The configuration of the authentication system can therefore be simplified.

An authentication method of Example 12 according to one aspect of the present disclosure may be the authentication method of any one of Examples 1 to 11, further including obtaining the biometric information from a medium in which the biometric information is recorded in a registration phase of the biometric information.

This makes it possible to obtain the biometric information from a medium without obtaining the biometric information directly from a living subject. The registered hash value corresponding to the biometric information can therefore be prepared more flexibly.

A program of Example 13 according to one aspect of the present disclosure is a program for causing a computer system to execute the authentication method of any one of Examples 1 to 12.

This makes it possible to implement the authentication method as a program. The effects achieved by the authentication method can therefore be achieved by the program as well.

An authentication system of Example 14 according to one aspect of the present disclosure is an authentication system including a plurality of computing devices that perform authentication processing on biometric information in a secret state using a secure computation based on a secret sharing scheme. The plurality of computing devices: compute, in a secret state, a hash value from a first feature value of the biometric information, using a hash function that preserves locality; convert the hash value from a first integer share that is a share of secret sharing in which a value is distributed using an integer of a first number of bits, to a binary share that is a share of secret sharing in which a value is distributed using a bit; after the hash value is converted, compute, in a secret state, an XOR bit sequence by performing an exclusive OR operation between the hash value and a registered hash value; convert the XOR bit sequence from the binary share to a second integer share that is a share of secret sharing in which a value is distributed using an integer of a second number of bits smaller than the first number of bits; after the XOR bit sequence is converted, compute, in a secret state, a Hamming distance between the hash value and the registered hash value, by computing a total of a plurality of bit values present in the XOR bit sequence; and determine, using the Hamming distance, whether a registered feature value corresponding to the registered hash value is to be used in the authentication processing.

This makes it possible to efficiently select registered feature values to be used in the authentication processing. Accordingly, the amount of computation performed in the authentication processing can be reduced. Furthermore, the XOR bit sequence can be computed efficiently using the binary share. Additionally, the total of the plurality of bit values in the XOR bit sequence can be efficiently computed and expressed using the second integer share corresponding to an integer of the second number of bits smaller than the first number of bits. This in turn makes it possible to accelerate the authentication processing.

Furthermore, these comprehensive or specific aspects of the present disclosure may be realized by a system, a device, a method, an integrated circuit, a computer program, or a non-transitory computer-readable recording medium such as a CD-ROM, or may be implemented by any desired combination of systems, devices, methods, integrated circuits, computer programs, and recording media.

An embodiment will be described hereinafter with reference to the drawings. The following embodiment will describe general or specific examples. The numerical values, shapes, materials, constituent elements, arrangements and connection states of constituent elements, steps, orders of steps, and the like in the following embodiments are merely examples, and are not intended to limit the scope of the claims.

Here, a face image is used as the biometric information. However, the biometric information is not limited to a face image, and fingerprint information, retina information, iris information, vein information, DNA information, or the like may be used.

Shooting a face to generate a face image, for example, may be referred to as "shooting a face image" here. "Training" the learning model corresponds to performing learning using the learning model.

"Encrypting" information corresponds to distributing the information or concealing the information. "Decrypting" information corresponds to stopping the distribution of the information or taking the information out of a secret (concealed) state. Here, decrypting secret information to obtain the information may be referred to simply as "decrypting" the information.

Here, three computing devices perform secure computations based on a secret sharing scheme, but secure computations based on the secret sharing scheme may be performed by two computing devices, or may be performed by four or more computing devices. Additionally, the secure computations based on the secret sharing scheme need not be performed by all the computing devices, and may instead be performed by two of the computing devices.

Embodiment

FIG. 1 is a block diagram illustrating the configuration of an authentication system according to an embodiment. FIG. 1 illustrates authentication system 500. Authentication system 500 is a computer system that performs authentication processing on biometric information using a secure computation based on a secret sharing scheme, and is also referred to as a "secret authentication system". Authentication system 500 includes terminal device 100, provision device 200, computing devices 300, 310, and 320, and authentication device 400.

Terminal device 100 is a computer device of a user, and can also be referred to as a "user terminal device". In a registration phase, terminal device 100 shoots a face image of the user, encrypts the face image based on the secret sharing scheme, and sends the face image to computing devices 300, 310, and 320.

Provision device 200 is a computer device that provides data, and can also be referred to as a "servicer" or a "data provision device". Provision device 200 provides a threshold, a feature value learning model, and a HashNet learning model to computing devices 300, 310, and 320.

Here, "threshold" refers to a threshold for determining whether authentication is successful. The feature value learning model is a learning model for computing feature values from a face image. Specifically, a face image is input to the feature value learning model, and feature values are output from the feature value learning model. The HashNet learning model is a learning model for computing a hash value from a feature value, and is also referred to simply as "HashNet". Specifically, feature values are input to the HashNet learning model, and hash values are output from the HashNet learning model.

"Feature value" refers to a feature value of the face image, and is used in authentication processing. Feature values may be expressed as vectors or tensors. In other words, "feature values" may be referred to as "feature vectors" or "feature tensors".

ArcFace (registered trademark), DeepFace, or the like may be used as the feature value learning model.

The HashNet learning model is one example of a hash function that preserves locality, and another hash function that preserves locality may be used instead of the HashNet learning model. The other hash function that preserves locality may be a hash function different from a machine learning model. A hash function that preserves locality is a hash function having a property in which the Hamming distance of two hash values for two feature values decreases as the two feature values become more similar to each other.

Each of computing devices 300, 310, and 320 is a computer device that performs operations on data, and may also be referred to as a "data processing device". Specifically, in the registration phase, computing devices 300, 310, and 320 receive a secret face image from terminal device 100, compute a secret feature value from the secret face image, and perform registration processing based on the secret feature value. In addition, in an authentication phase, computing devices 300, 310, and 320 receive the secret face image from authentication device 400, compute the secret feature value from the secret face image, and perform the authentication processing based on the secret feature value.

Authentication device 400 is a computer device that accepts requests for authentication. Specifically, in the authentication phase, authentication device 400 shoots a face image of the user, encrypts the face image based on the secret sharing scheme, and sends the face image to computing devices 300, 310, and 320. In addition, in the authentication phase, authentication device 400 receives a secret authentication result from computing devices 300, 310, and 320, and decrypts and uses the authentication result. For example, the authentication result may be displayed, or processing corresponding to the authentication result may be performed.

Figure 2:
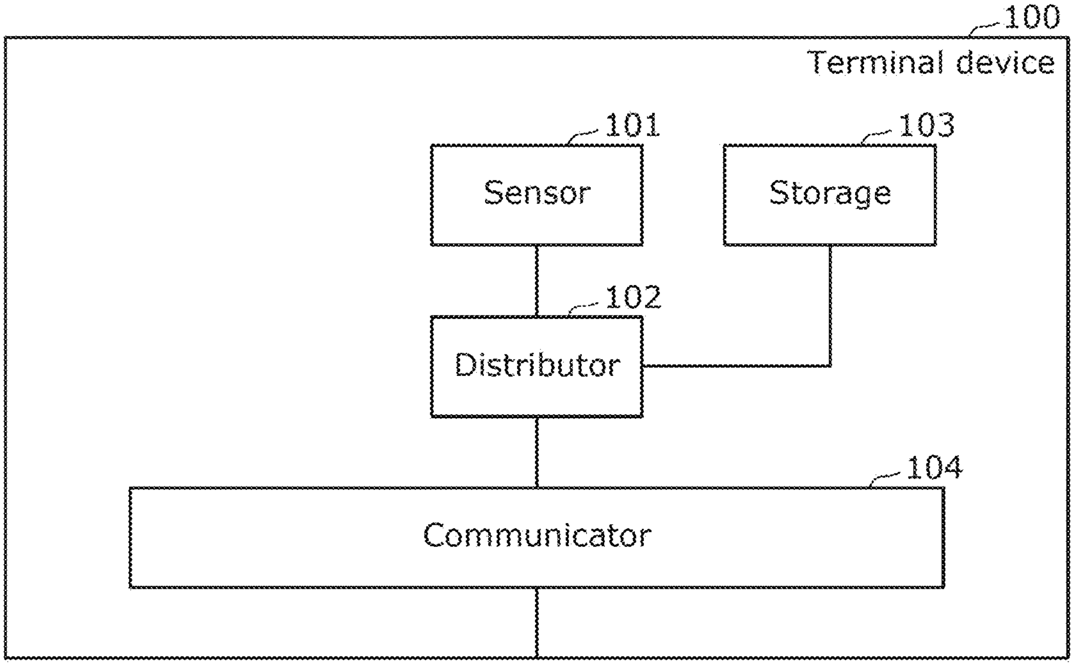
FIG. 2 is a block diagram illustrating the configuration of a terminal device according to an embodiment.

FIG. 2 is a block diagram illustrating the configuration of terminal device 100 according to the embodiment. Terminal device 100 includes sensor 101, distributor 102, storage 103, and communicator 104.

Sensor 101 is a sensor that senses biometric information. Specifically, sensor 101 shoots a face image of the user.

Distributor 102 is processing circuitry that encrypts information based on a secret sharing scheme. Specifically, distributor 102 derives the secret face image by encrypting the face image shot by sensor 101. Additionally, distributor 102 derives a secret user ID by obtaining, from storage 103, a user ID for identifying the user, and encrypting the user ID.

Storage 103 is a memory for storing information. Storage 103 may be a volatile memory or a non-volatile memory. Specifically, the user ID is stored in storage 103.

Communicator 104 is processing circuitry for communication. Specifically, communicator 104 sends the secret feature value and the secret user ID derived by distributor 102 to computing devices 300, 310, and 320.

Figure 3:
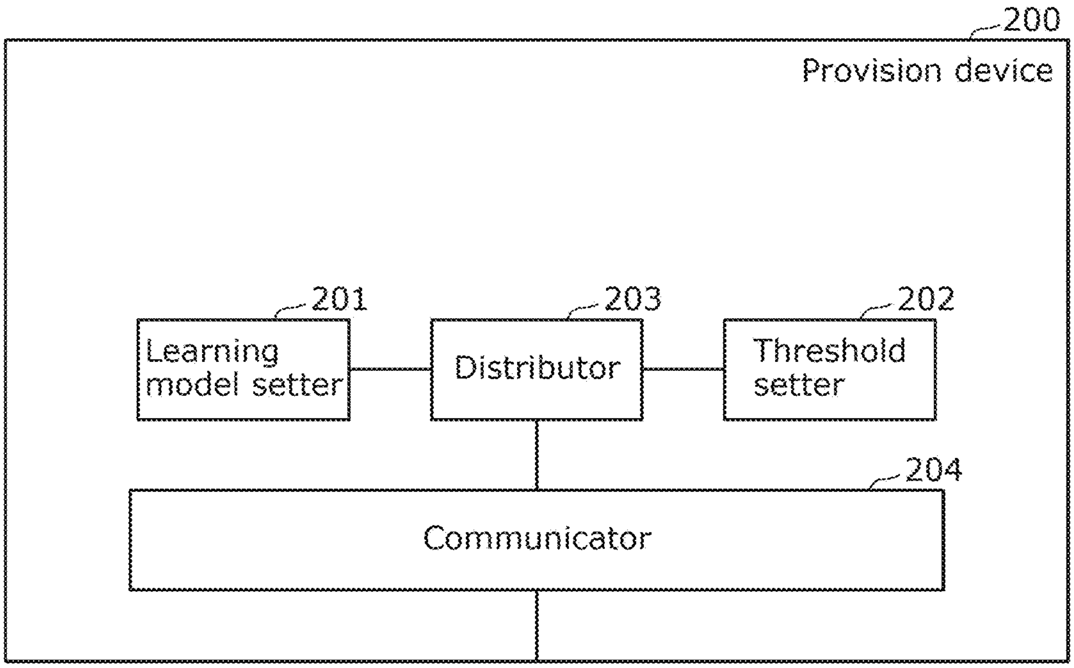
FIG. 3 is a block diagram illustrating the configuration of a provision device according to an embodiment.

FIG. 3 is a block diagram illustrating the configuration of provision device 200 according to the embodiment. Provision device 200 includes learning model setter 201, threshold setter 202, distributor 203, and communicator 204.

Learning model setter 201 is processing circuitry that sets a learning model. Specifically, learning model setter 201 trains the feature value learning model and the HashNet learning model. More specifically, learning model setter 201 trains the feature value learning model such that a feature value for which the success or failure of authentication is accurately determined is derived from the face image. Additionally, learning model setter 201 trains the HashNet learning model such that a hash value having a property in which the Hamming distance of the two hash values decreases as the two feature values become more similar to each other is derived from the feature value.

Threshold setter 202 is processing circuitry that sets a threshold used in the authentication processing. Specifically, threshold setter 202 sets a threshold at which the success or failure of the authentication is accurately determined. Threshold setter 202 may select a threshold from a plurality of threshold candidates, or may set the threshold using machine learning.

Distributor 203 is processing circuitry that encrypts information based on a secret sharing scheme. Specifically, distributor 203 derives a secret feature value learning model, a secret HashNet learning model, and a secret threshold by encrypting the feature value learning model, the HashNet learning model, and the threshold.

Communicator 204 is processing circuitry for communication. Specifically, communicator 204 sends the secret feature value learning model, the secret HashNet learning model, and the secret threshold to computing devices 300, 310, and 320.

Figure 4:
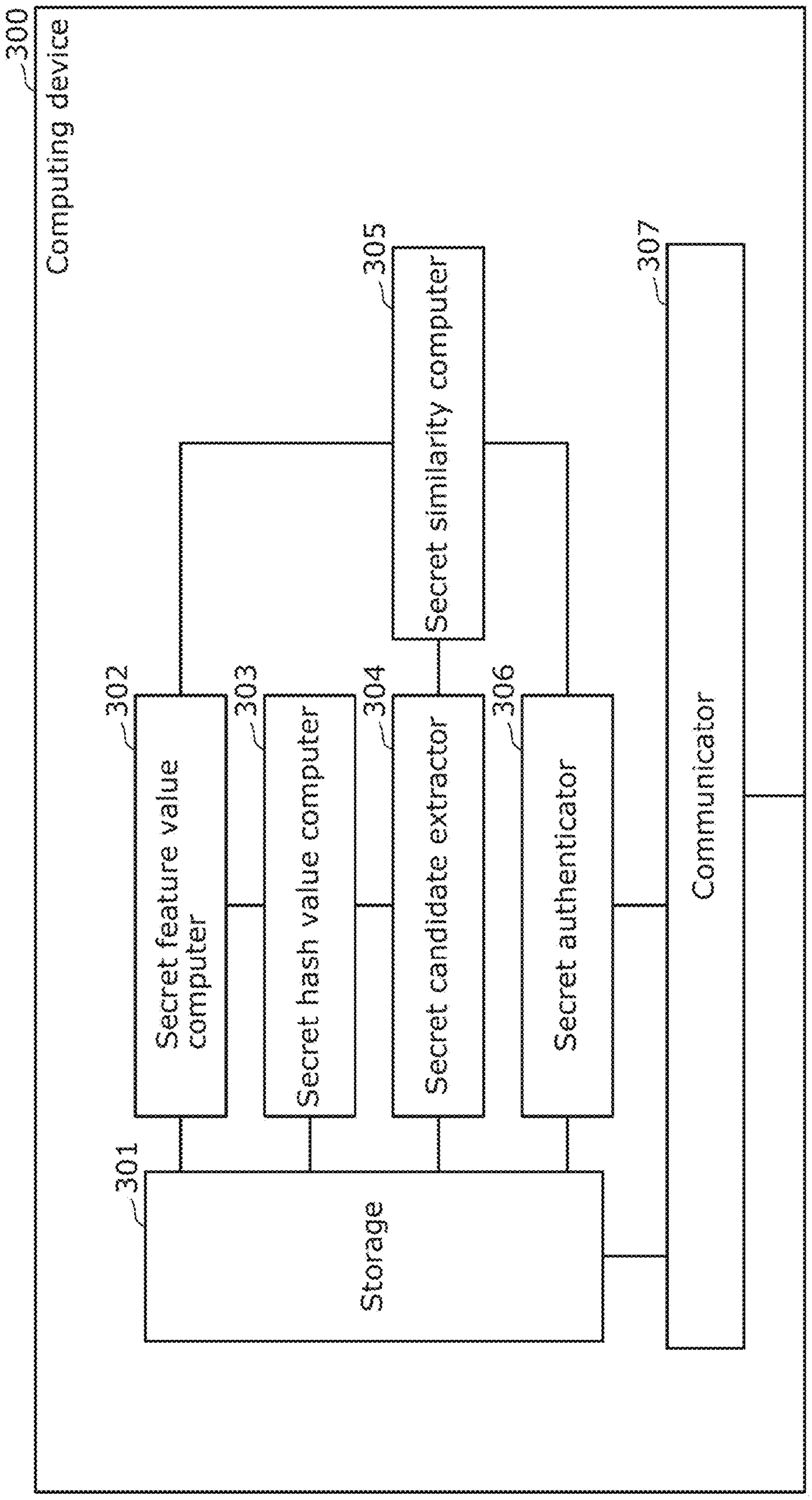
FIG. 4 is a block diagram illustrating the configuration of a computing device according to an embodiment.

FIG. 4 is a block diagram illustrating the configuration of computing device 300 according to the embodiment. Computing device 300 includes storage 301, secret feature value computer 302, secret hash value computer 303, secret candidate extractor 304, secret similarity computer 305, secret authenticator 306, and communicator 307. Computing devices 310 and 320 also include the same plurality of constituent elements as those of computing device 300.

Storage 301 is a memory for storing information. Storage 301 may be a volatile memory or a non-volatile memory. Specifically, the secret feature value learning model and the secret HashNet learning model sent from provision device 200 are stored in storage 301. The secret face image and the secret user ID sent from terminal device 100 are also stored in storage 301. The secret face image sent from authentication device 400 is also stored in storage 301.

A plurality of secret hash values, a plurality of secret feature values, and a plurality of secret user IDs for a plurality of users are also stored in storage 301. Specifically, the plurality of secret hash values, the plurality of secret feature values, and the plurality of secret user IDs for the plurality of users are stored in a table (a registered user table) in storage 301.

The above-described information is distributed and stored in storage 301 of the three computing devices 300, 310, and 320 based on the secret sharing scheme.

Secret feature value computer 302 is processing circuitry that performs secure computations based on the secret sharing scheme in computing devices 300, 310, and 320. Specifically, secret feature value computer 302 computes the secret feature value based on the secret face image and the secret feature value learning model. More specifically, secret feature value computer 302 derives the secret feature value from the secret face image through the secret feature value learning model.

Secret hash value computer 303 is processing circuitry that performs secure computations based on the secret sharing scheme in computing devices 300, 310, and 320. Specifically, secret hash value computer 303 computes the secret hash value based on the secret feature value and the secret HashNet learning model. More specifically, secret hash value computer 303 derives the secret hash value from the secret feature value through the secret HashNet learning model.

Secret candidate extractor 304 is processing circuitry that performs secure computations based on the secret sharing scheme in computing devices 300, 310, and 320. Specifically, secret candidate extractor 304 extracts at least one secret feature value candidate from the plurality of secret feature values based on the secret hash value.

More specifically, secret candidate extractor 304 computes a secret Hamming distance between the secret hash value computed by secret hash value computer 303 and each of the plurality of secret hash values stored in storage 301. Secret candidate extractor 304 then extracts at least one secret feature value candidate based on the secret Hamming distance.

Secret similarity computer 305 is processing circuitry that performs secure computations based on the secret sharing scheme in computing devices 300, 310, and 320. Specifically, secret similarity computer 305 computes a secret similarity between each of the at least one secret feature value candidate and the secret feature value.

Secret authenticator 306 is processing circuitry that performs secure computations based on the secret sharing scheme in computing devices 300, 310, and 320. Specifically, secret authenticator 306 derives a secret authentication result based on the secret similarity and the secret threshold. The authentication result indicates whether the authentication is successful. If the authentication result indicates the authentication is successful, the authentication result may further indicate the user ID.

More specifically, secret authenticator 306 determines whether a highest secret similarity is higher than the secret threshold. Secret authenticator 306 then determines that the authentication is successful if the highest secret similarity is at least the secret threshold. On the other hand, secret authenticator 306 determines that the authentication has failed if the highest secret similarity is not at least the secret threshold.

Communicator 307 is processing circuitry for communication. Specifically, communicator 307 receives the secret feature value learning model and the secret HashNet learning model from provision device 200. Communicator 307 also receives the secret face image and the secret user ID from terminal device 100. Communicator 307 also receives the secret face image from authentication device 400. Communicator 307 also sends the secret authentication result to authentication device 400.

Figure 5:
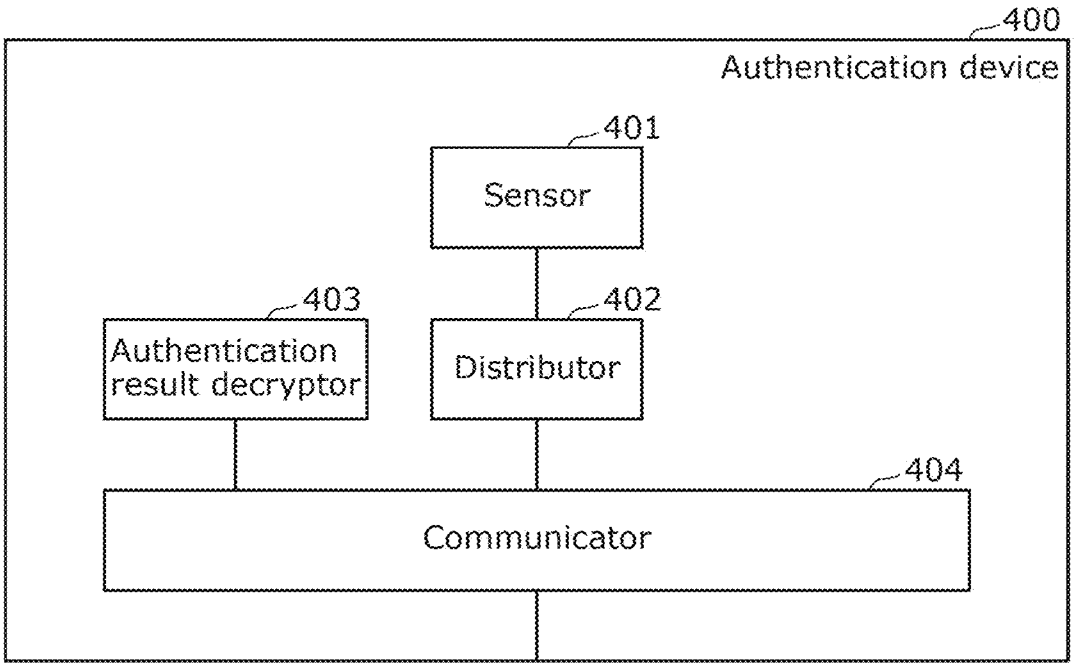
FIG. 5 is a block diagram illustrating the configuration of an authentication device according to an embodiment.

FIG. 5 is a block diagram illustrating the configuration of authentication device 400 according to the embodiment. Authentication device 400 includes sensor 401, distributor 402, authentication result decryptor 403, and communicator 404.

Sensor 401 is a sensor that senses biometric information. Specifically, sensor 401 shoots a face image of the user.

Distributor 402 is processing circuitry that encrypts information based on a secret sharing scheme. Specifically, distributor 402 derives the secret face image by encrypting the face image shot by sensor 401.

Authentication result decryptor 403 is processing circuitry that decrypts information based on a secret sharing scheme. Specifically, authentication result decryptor 403 derives an authentication result by decrypting the secret authentication results sent from computing devices 300, 310, and 320.

Communicator 404 is processing circuitry for communication. Specifically, communicator 404 sends the secret feature value derived by distributor 402 to computing devices 300, 310, and 320. Additionally, communicator 404 receives the secret authentication results from computing devices 300, 310, and 320.

Figure 6:
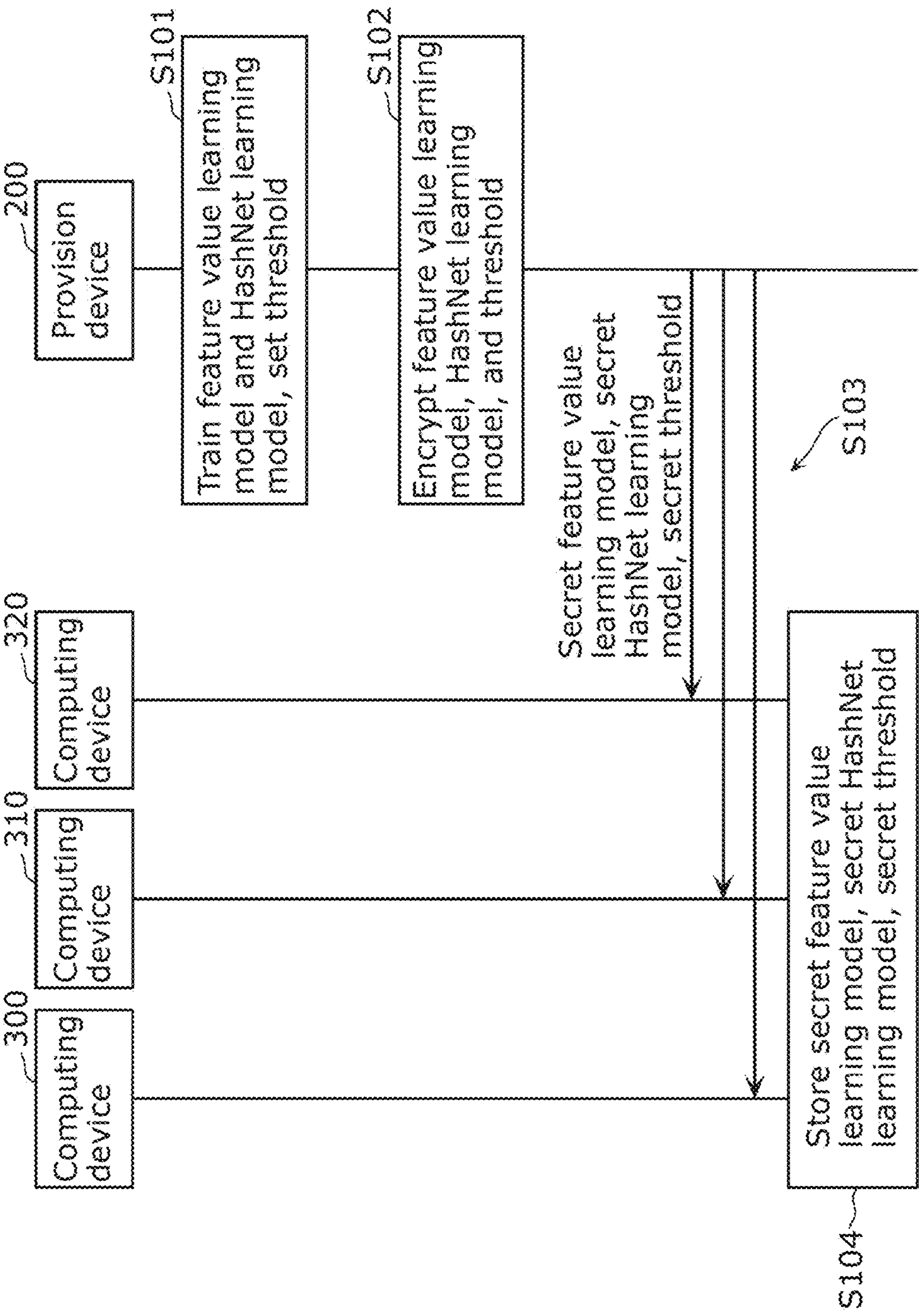
FIG. 6 is a sequence chart illustrating operations in an initialization phase according to an embodiment.

FIG. 6 is a sequence chart illustrating operations in the initialization phase according to the embodiment. First, provision device 200 trains the feature value learning model and the HashNet learning model using training data collected in advance. In addition, provision device 200 sets a threshold for determining whether authentication is successful (S101).

Next, provision device 200 encrypts the feature value learning model, the HashNet learning model, and the threshold based on the secret sharing scheme, and derives the secret feature value learning model, the secret HashNet learning model, and the secret threshold (S102). Provision device 200 then sends the secret feature value learning model, the secret HashNet learning model, and the secret threshold to computing devices 300, 310, and 320 (S103).

Computing devices 300, 310, and 320 store the secret feature value learning model, the secret HashNet learning model, and the secret threshold (S104).

Figure 7:
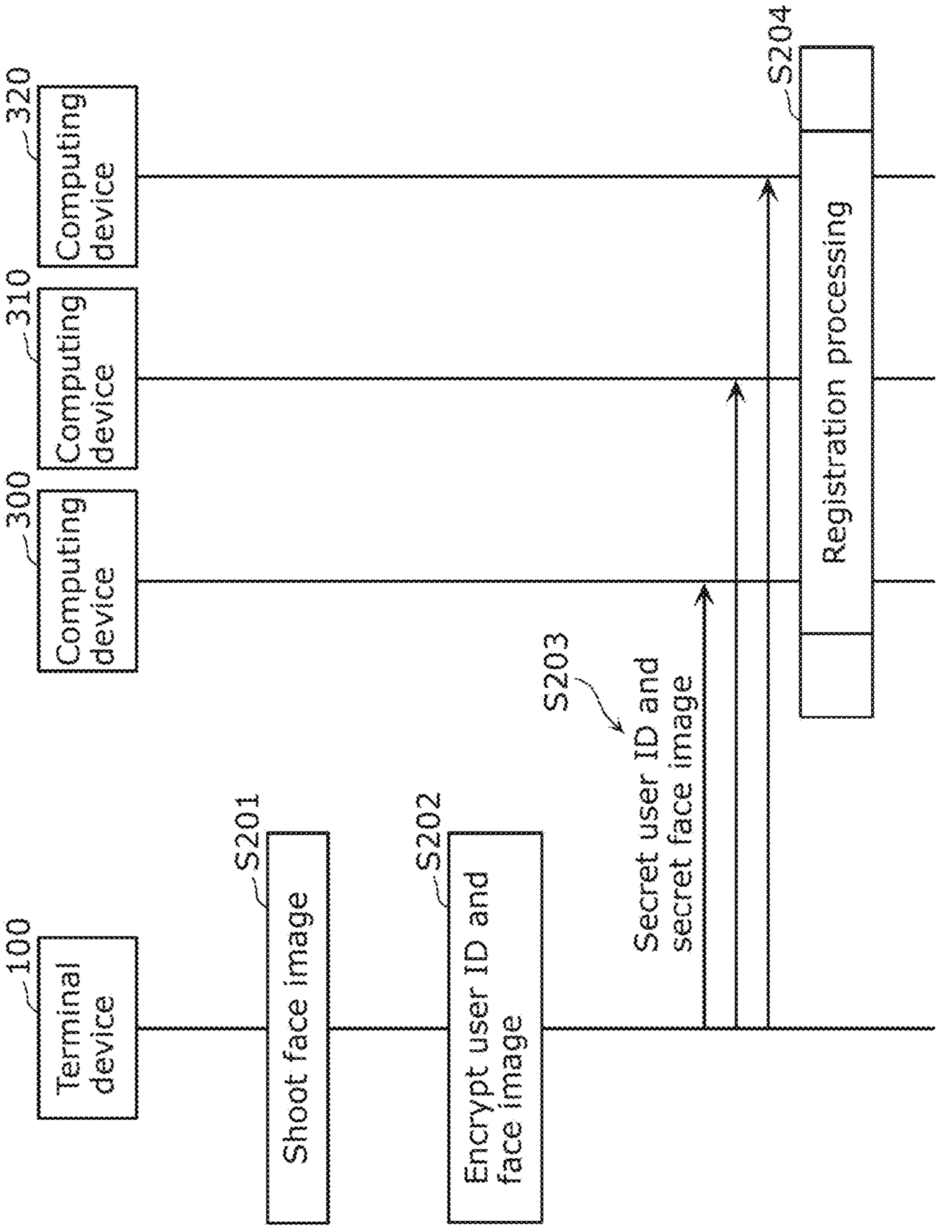
FIG. 7 is a sequence chart illustrating operations in a registration phase according to an embodiment.

FIG. 7 is a sequence chart illustrating operations in the registration phase according to the embodiment. First, terminal device 100 shoots a face image of the user (S201). Next, terminal device 100 derives the secret user ID and the secret face image by encrypting the user ID and the face image (S202). Terminal device 100 then sends the secret user ID and the secret face image to computing devices 300, 310, and 320 (S203).

Computing devices 300, 310, and 320 perform registration processing based on the secret user ID and the secret face image (S204).

Figure 8:
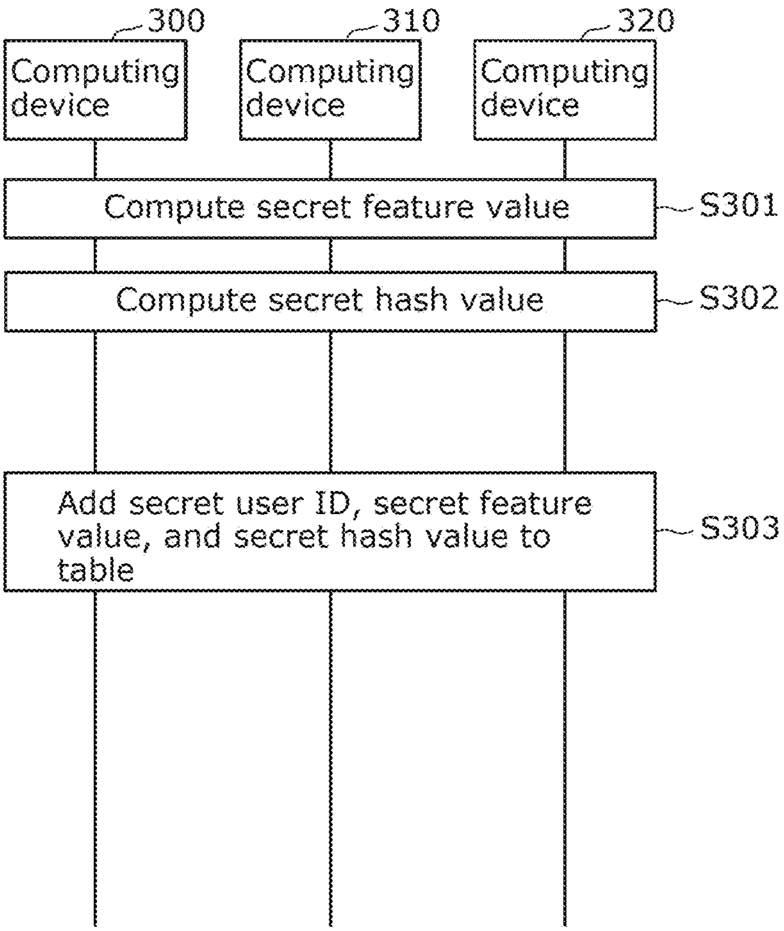
FIG. 8 is a sequence chart illustrating registration processing according to an embodiment.

FIG. 8 is a sequence chart illustrating the registration processing (S204) according to the embodiment. First, computing devices 300, 310, and 320 compute the secret feature value (S301). Specifically, computing devices 300, 310, and 320 derive the secret feature value from the secret face image through the secret feature value learning model. Next, computing devices 300, 310, and 320 compute the secret hash value (S302). Specifically, computing devices 300, 310, and 320 derive the secret hash value from the secret feature value through the secret HashNet learning model.

Computing devices 300, 310, and 320 then store the secret user ID, the secret feature value, and the secret hash value by adding the secret user ID, the secret feature value, and the secret hash value to a table (S303).

Figure 9:
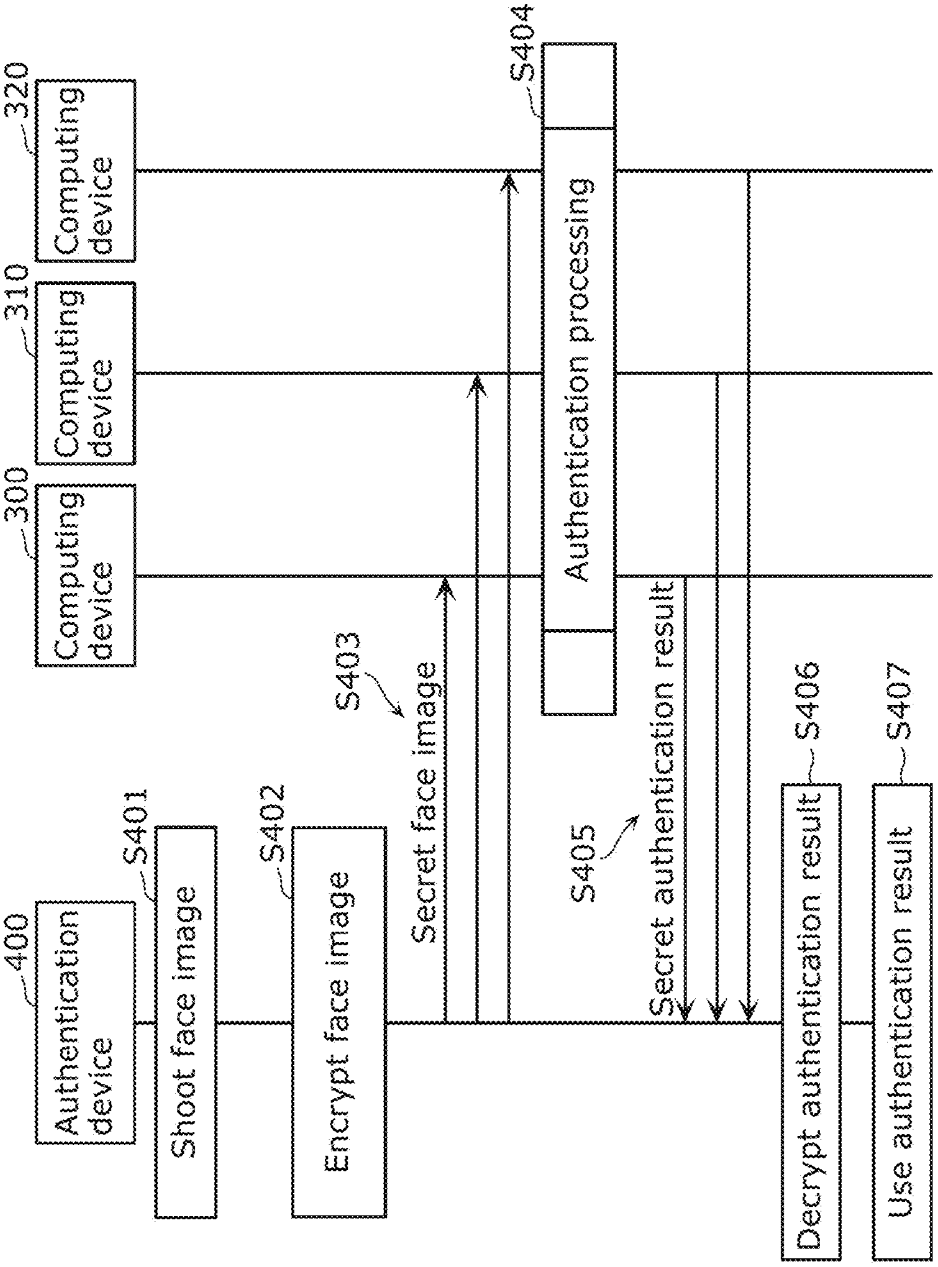
FIG. 9 is a sequence chart illustrating operations in an authentication phase according to an embodiment.

FIG. 9 is a sequence chart illustrating operations in the authentication phase according to the embodiment. First, authentication device 400 shoots a face image of the user (S401). Next, authentication device 400 derives the secret face image by encrypting the face image (S402). Authentication device 400 then sends the secret face image to computing devices 300, 310, and 320 (S403).

Computing devices 300, 310, and 320 perform the authentication processing based on the secret face image (S404). Computing devices 300, 310, and 320 then send the secret authentication result obtained from the authentication processing to authentication device 400 (S405).

Authentication device 400 derives the authentication result by decrypting the secret authentication result (S406).

Authentication device 400 then uses the authentication result (S407). For example, authentication device 400 performs processing corresponding to the authentication result. In addition, if the authentication result indicates the authentication is successful, authentication device 400 may perform processing based on the user ID further indicated by the authentication result.

Figure 10:
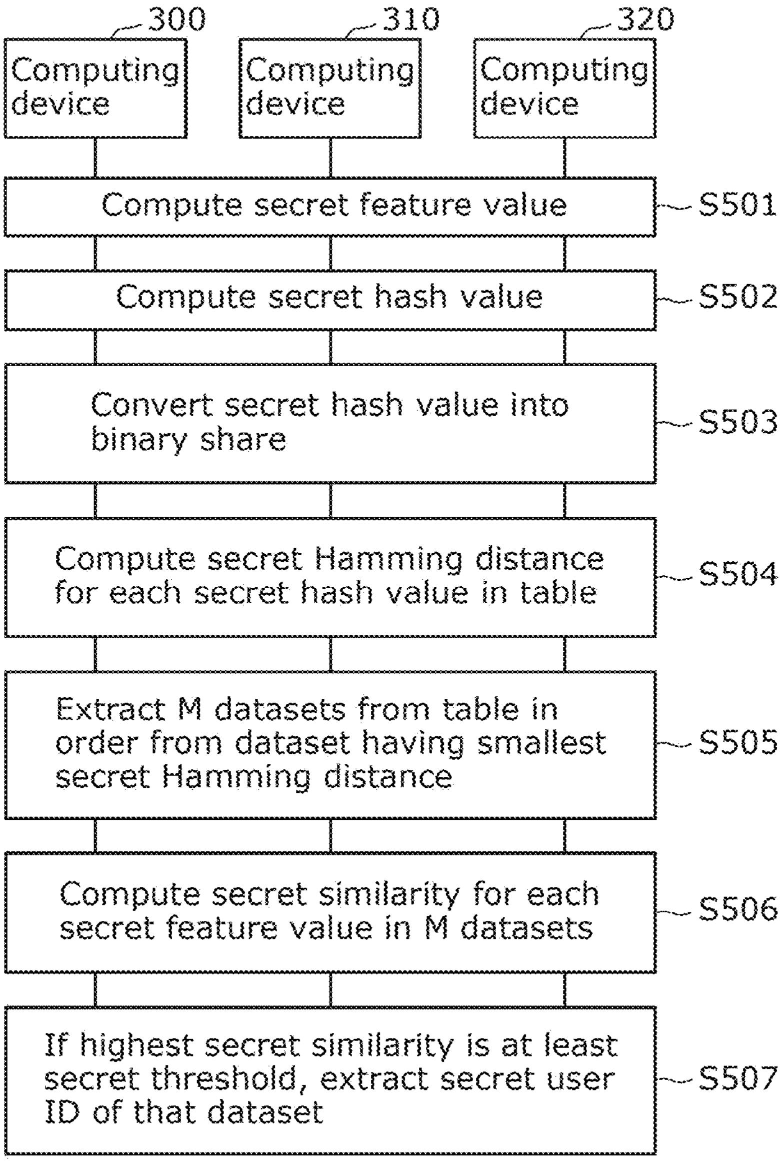
FIG. 10 is a sequence chart illustrating authentication processing according to an embodiment.

FIG. 10 is a sequence chart illustrating the authentication processing (S404) according to the embodiment. First, computing devices 300, 310, and 320 compute the secret feature value (S501). Specifically, computing devices 300, 310, and 320 derive the secret feature value from the secret face image through the secret feature value learning model. Next, computing devices 300, 310, and 320 compute the secret hash value (S502). Specifically, computing devices 300, 310, and 320 derive the secret hash value from the secret feature value through the secret HashNet learning model.

Next, computing devices 300, 310, and 320 convert the secret hash value from an integer share to a binary share (S503). In other words, computing devices 300, 310, and 320 convert the hash value in the secret state from an integer share to a binary share.

For example, the integer share is a share of an additive secret sharing scheme, and the binary share is a share of an XOR secret sharing scheme. In other words, the integer share is a share of secret sharing in which values are distributed using integers (i.e., in units of integers), whereas the binary share is a share of secret sharing in which values are distributed using bits (i.e., in units of bits). Here, "share" corresponds to data obtained through the secret sharing.

Computing devices 300, 310, and 320 also convert each secret hash value in the table from an integer share to a binary share. It is assumed here that N datasets are present in the table. Each dataset includes a user ID, a feature value, and a hash value in a secret state. Computing devices 300, 310, and 320 convert the N hash values in a secret state in the table from integer shares to binary shares.

Computing devices 300, 310, and 320 then compute the secret Hamming distance between the secret hash value corresponding to the data to be authenticated and each secret hash value in the table. In other words, computing devices 300, 310, and 320 compute N Hamming distances in a secret state for the N hash values in the table (S504).

Specifically, in a secret state in the binary share, computing devices 300, 310, and 320 compute an XOR bit sequence using an exclusive OR operation between the hash value corresponding to the data to be authenticated and each hash value in the table. Here, the XOR bit sequence is a sequence generated by performing an exclusive OR operation bit-by-bit between two hash values.

Computing devices 300, 310, and 320 then convert the XOR bit sequence in the secret state from a binary share to an integer share. At that time, computing devices 300, 310, and 320 convert the XOR bit sequence in the secret state to a second integer share, which is an integer share different from a first integer share, the first integer share being the original integer share.

Here, the first integer share is a share of secret sharing in which values are distributed using integers of a first number of bits (i.e., in units of integers having the first number of bits). The second integer share is a share of secret sharing in which values are distributed using integers of a second number of bits smaller than the first number of bits (i.e., in units of integers having the second number of bits).

The first number of bits may be a number of bits for expressing a value of the feature value, or may be a number of bits of each element of a feature vector or feature tensor corresponding to the feature. The second number of bits may be a substantial number of bits for expressing a hash value.

Then, in the secret state in the second integer share, computing devices 300, 310, and 320 compute a sum of the plurality of bit values in the XOR bit sequence as a Hamming distance. Through this, computing devices 300, 310, and 320 efficiently compute the secret Hamming distance between the secret hash value corresponding to the data to be authenticated and each secret hash value in the table.

Next, computing devices 300, 310, and 320 extract M datasets from the table in order from the smallest secret Hamming distance (S505). Specifically, in the secret state in the second integer share, computing devices 300, 310, and 320 sort the N datasets according to the N Hamming distances, and extract the M datasets in order from the smallest Hamming distance.

Here, N and M are natural numbers, and M is basically smaller than N. When N is sufficiently small, i.e., when N is not greater than a reference, M may be equal to N. In other words, M may be N or smaller.

Next, computing devices 300, 310, and 320 compute the secret similarity between the secret feature value corresponding to the data to be authenticated and each secret feature value in the M datasets. In other words, computing devices 300, 310, and 320 compute M secret similarities for the M secret feature values (M secret feature value candidates) in the M datasets (S506).

Specifically, in the secret state in the first integer share, computing devices 300, 310, and 320 compute, by a secure computation, the similarity between the feature value corresponding to the data to be authenticated and the feature value in each of the M datasets. The similarity increases the more the two feature values resemble each other. The similarity may correspond to a Euclidean distance, a cosine similarity, or a value obtained by processing these. The similarity may also correspond to a value called a "distance score".

Then, if the highest secret similarity is at least a secret threshold, computing devices 300, 310, and 320 extract the secret user ID in that dataset (S507).

Specifically, computing devices 300, 310, and 320 determine, in the secret state in the first integer share, whether the highest similarity among the M similarities computed by the secure computation is at least a threshold.

If the highest similarity is at least the threshold, computing devices 300, 310, and 320 generate a secret authentication result indicating that the authentication is successful, extract the secret user ID of the dataset corresponding to the highest similarity, and include that secret user ID in the secret authentication result. However, if the highest similarity is not at least the threshold, computing devices 300, 310, and 320 generate a secret authentication result indicating the authentication has failed.

FIG. 11 is a schematic diagram illustrating a table (a registered user table) according to the embodiment. Here, the table includes the secret user IDs, the secret hash values, and the secret feature values. The table is distributed among and held by the three computing devices 300, 310, and 320. The three computing devices 300, 310, and 320 perform the secure computation using the secret user ID, the secret hash value, and the secret feature value while still in the secret state.

In the embodiment, hash values can be used to extract candidates quickly. In addition, converting the hash value from an integer share to a binary share makes it possible to perform the exclusive OR operation (XOR) quickly. Furthermore, returning the XOR bit sequence to an integer share having a small number of bits makes it possible to compute the sum of the bit values quickly. The Hamming distance can therefore be computed quickly and expressed efficiently. This in turn makes it possible to accelerate the authentication processing.

Specifically, binary shares are based on bits and are therefore suitable for bit operations. The first integer share is based on an integer having the first number of bits, which is greater than the second number of bits, and is therefore suitable for processing relatively large values. The second integer share is based on an integer having the second number of bits, which is lower than the first number of bits, and is therefore suitable for processing relatively small values. Using these makes it possible to accelerate the authentication processing.

Figure 12:
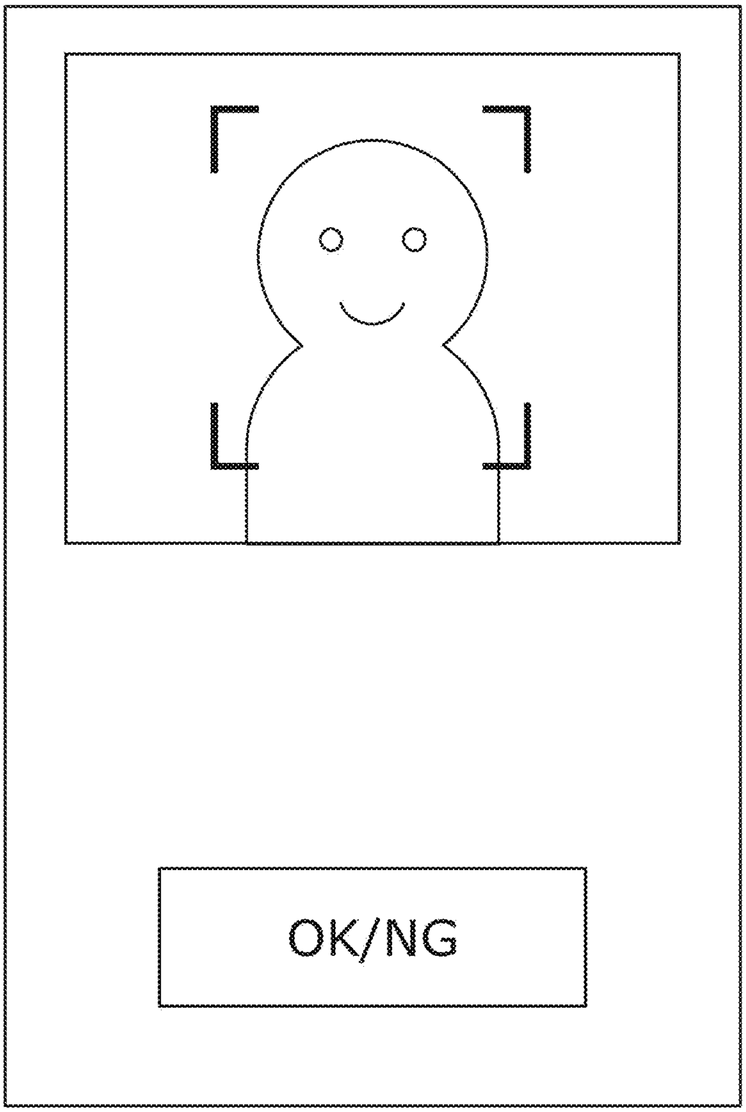
FIG. 12 is a conceptual diagram illustrating an authentication result display screen according to an embodiment.

FIG. 12 is a conceptual diagram illustrating an authentication result display screen according to the embodiment. For example, authentication device 400 derives the authentication result by receiving a secret authentication result and decrypting the secret authentication result. Authentication device 400 then displays authentication result on the screen as illustrated in FIG. 12.

Specifically, when the authentication result indicates that the authentication is successful, authentication device 400 may display on the screen that the authentication is successful ("OK"). If the authentication result indicates that the authentication has failed, authentication device 400 may display on the screen that the authentication has failed ("NG"). Furthermore, authentication device 400 may display the face image shot by authentication device 400, i.e., the face image used in the authentication processing, on the screen.

Multiple variations which can be applied to the foregoing embodiment will be described below. Only one of the following variations may be applied to the foregoing embodiment, or two or more of the following variations may be combined and applied to the foregoing embodiment. In the following, descriptions that are the same as in the foregoing embodiment may be omitted.

Variation 1

In Variation 1, some processing is performed in plain text. In other words, some processing is performed without secure computations. This accelerates the authentication processing.

Terminal device 100 according to Variation 1 includes the same constituent elements as those of terminal device 100 illustrated in FIG. 2.

Figure 13:
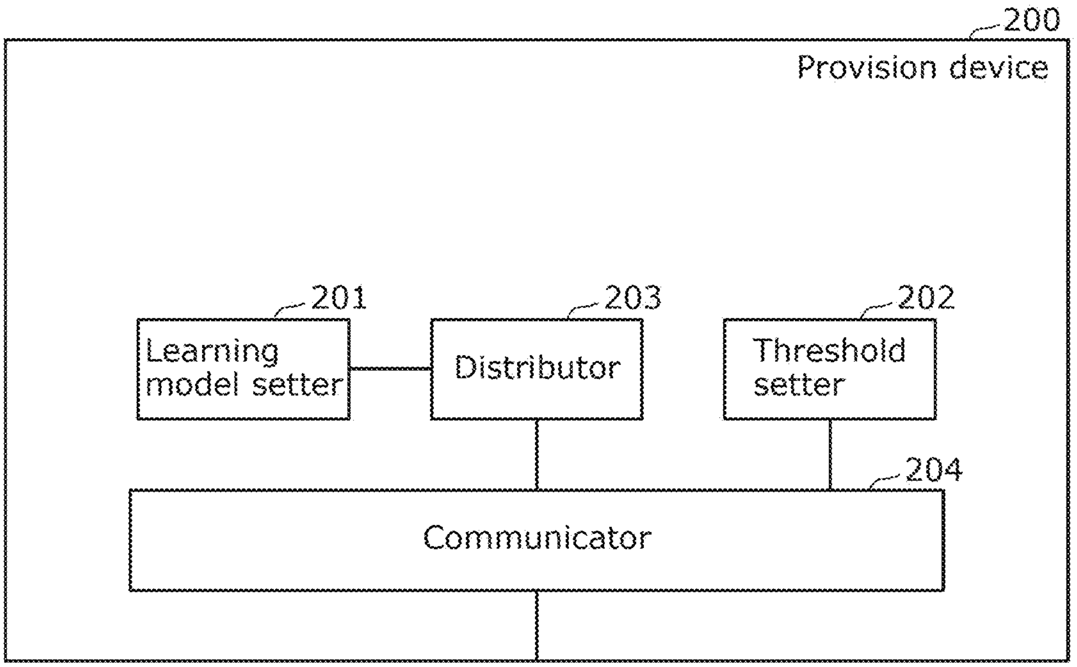
FIG. 13 is a block diagram illustrating the configuration of a provision device according to Variation 1.

FIG. 13 is a block diagram illustrating the configuration of provision device 200 according to Variation 1. Provision device 200 according to Variation 1 includes the same constituent elements as those of provision device 200 illustrated in FIG. 3. However, the threshold set by threshold setter 202 is sent to computing devices 300, 310, and 320 through communicator 204 without being encrypted by distributor 203.

Computing devices 300, 310, and 320 according to Variation 1 include the same constituent elements as those of computing device 300 illustrated in FIG. 4. However, after computing the secret Hamming distance, secret candidate extractor 304 derives the Hamming distance by decrypting the secret Hamming distance, and performs processing using the Hamming distance instead of the secret Hamming distance. Additionally, after computing the secret similarity, secret similarity computer 305 derives the similarity by decrypting the secret similarity, and performs processing using the similarity instead of the secret similarity.

Authentication device 400 according to Variation 1 includes the same constituent elements as those of authentication device 400 illustrated in FIG. 5.

Figure 14:
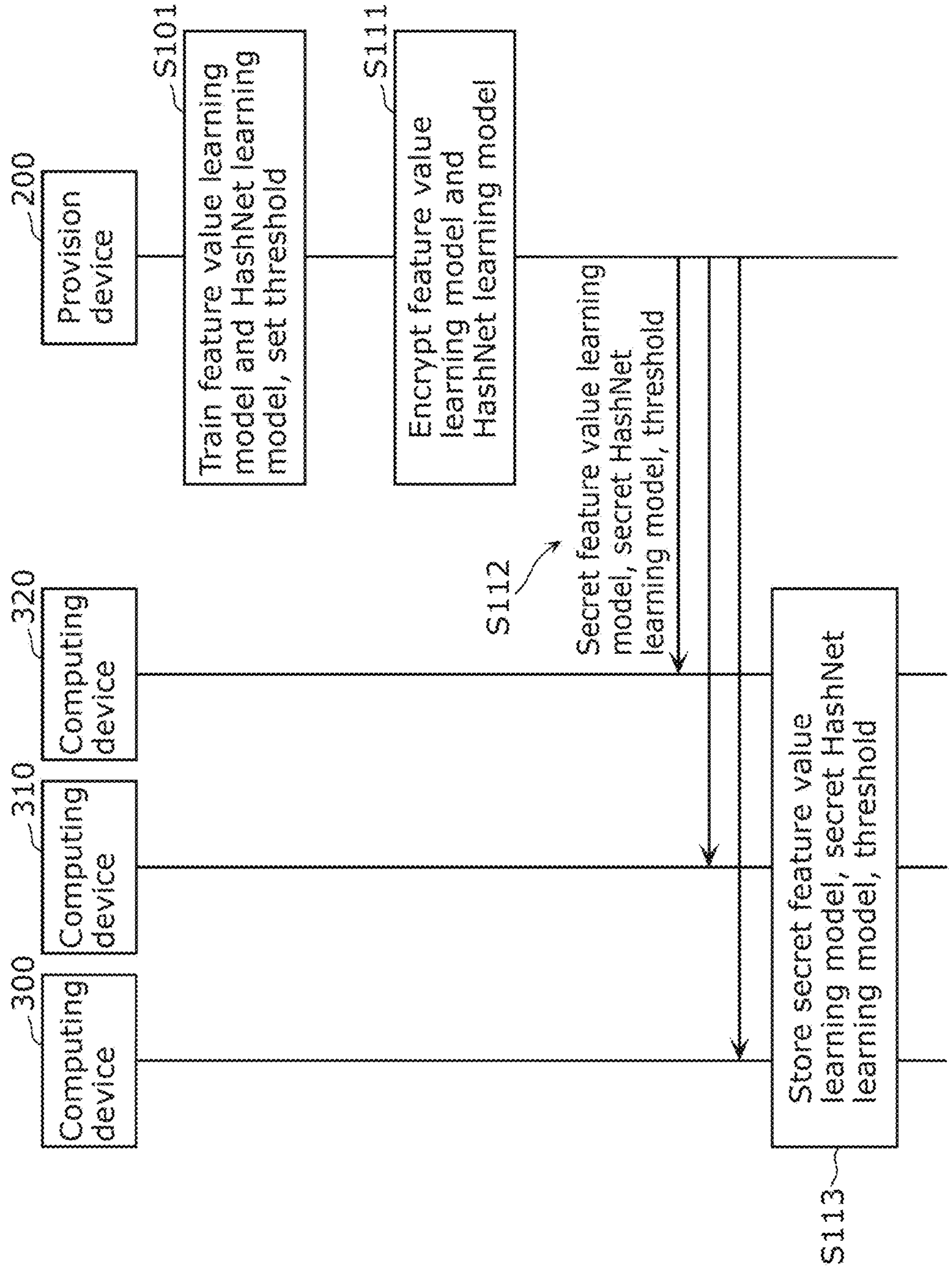
FIG. 14 is a sequence chart illustrating operations in an initialization phase according to Variation 1.

FIG. 14 is a sequence chart illustrating operations in the initialization phase according to Variation 1. First, as in the example in FIG. 6, provision device 200 trains the feature value learning model and the HashNet learning model. In addition, provision device 200 sets a threshold for determining whether authentication is successful (S101).

Next, provision device 200 encrypts the feature value learning model and the HashNet learning model based on the secret sharing scheme, and derives the secret feature value learning model and the secret HashNet learning model (S111). The threshold is not encrypted. Provision device 200 then sends the secret feature value learning model, the secret HashNet learning model, and the threshold to computing devices 300, 310, and 320 (S112).

Computing devices 300, 310, and 320 store the secret feature value learning model, the secret HashNet learning model, and the threshold (S113).

The operations in the registration phase according to Variation 1 are the same as the operations in the registration phase illustrated in FIG. 7. The registration processing according to Variation 1 is the same as the registration processing illustrated in FIG. 8. The operations in the authentication phase according to Variation 1 are the same as the operations in the authentication phase illustrated in FIG. 9.

Figure 15:
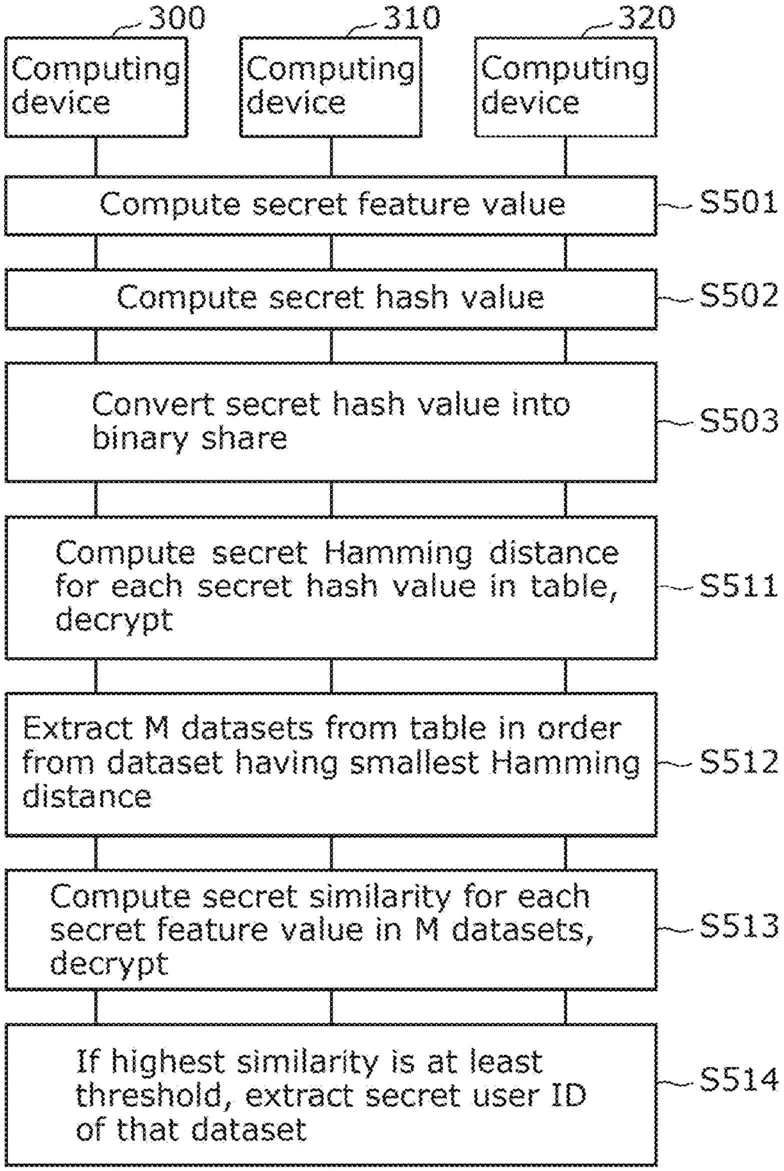
FIG. 15 is a sequence chart illustrating authentication processing according to Variation 1.

FIG. 15 is a sequence chart illustrating the authentication processing (S404) according to Variation 1. First, as in the example in FIG. 10, computing devices 300, 310, and 320 compute the secret feature value (S501), compute the secret hash value (S502), and convert the secret hash value from an integer share to a binary share (S503). Computing devices 300, 310, and 320 also convert the N hash values in a secret state in the table from integer shares to binary shares.

Next, as in the example in FIG. 10, computing devices 300, 310, and 320 compute the secret Hamming distance between the secret hash value corresponding to the data to be authenticated and each secret hash value in the table. In other words, computing devices 300, 310, and 320 compute N Hamming distances in a secret state for the N hash values in the table. Computing devices 300, 310, and 320 then derive the N Hamming distances by decrypting the N secret Hamming distances (S511).

Next, computing devices 300, 310, and 320 extract M datasets from the table in order from the smallest Hamming distance (S512). Specifically, computing devices 300, 310, and 320 sort the N datasets according to the N Hamming distances, and extract the M datasets in the order from the smallest Hamming distance.

Next, as in the example in FIG. 10, computing devices 300, 310, and 320 compute the secret similarity between the secret feature value corresponding to the data to be authenticated and each secret feature value in the M datasets. In other words, computing devices 300, 310, and 320 compute M secret similarities for the M secret feature values (M secret feature value candidates) in the M datasets. Computing devices 300, 310, and 320 then derive the M similarities by decrypting the M secret similarities (S513).

Then, if the highest similarity is at least a threshold, computing devices 300, 310, and 320 extract the secret user ID in that dataset (S514). Specifically, computing devices 300, 310, and 320 determine whether the highest similarity among the M similarities computed by the secure computation and decrypted is at least the threshold.

If the highest similarity is at least the threshold, computing devices 300, 310, and 320 generate a secret authentication result indicating that the authentication is successful, extract the secret user ID of the dataset corresponding to the highest similarity, and include that secret user ID in the secret authentication result. However, if the highest similarity is not at least the threshold, computing devices 300, 310, and 320 generate a secret authentication result indicating the authentication has failed.

As described above, in Variation 1, some processing is performed without secure computations. This accelerates the authentication processing.

Variation 2

In Variation 2, in the registration processing, the secret hash value is converted to a binary share. This makes it possible to omit the processing of converting the secret hash values in the table into binary shares each time the authentication processing is performed. This accelerates the authentication processing.

Terminal device 100 according to Variation 2 includes the same constituent elements as those of terminal device 100 illustrated in FIG. 2.

Provision device 200 according to Variation 2 includes the same constituent elements as those of provision device 200 illustrated in FIG. 3.

Computing devices 300, 310, and 320 according to Variation 2 include the same constituent elements as those of computing device 300 illustrated in FIG. 4. However, in the registration processing too, after the secret hash value is computed, secret hash value computer 303 converts the secret hash value into a binary share. The secret hash value converted to a binary share is then stored in the table in storage 301.

Authentication device 400 according to Variation 2 includes the same constituent elements as those of authentication device 400 illustrated in FIG. 5.

The operations in the initialization phase in Variation 2 are the same as the operations in the initialization phase illustrated in FIG. 6. The operations in the registration phase according to Variation 2 are the same as the operations in the registration phase illustrated in FIG. 7.

Figure 16:
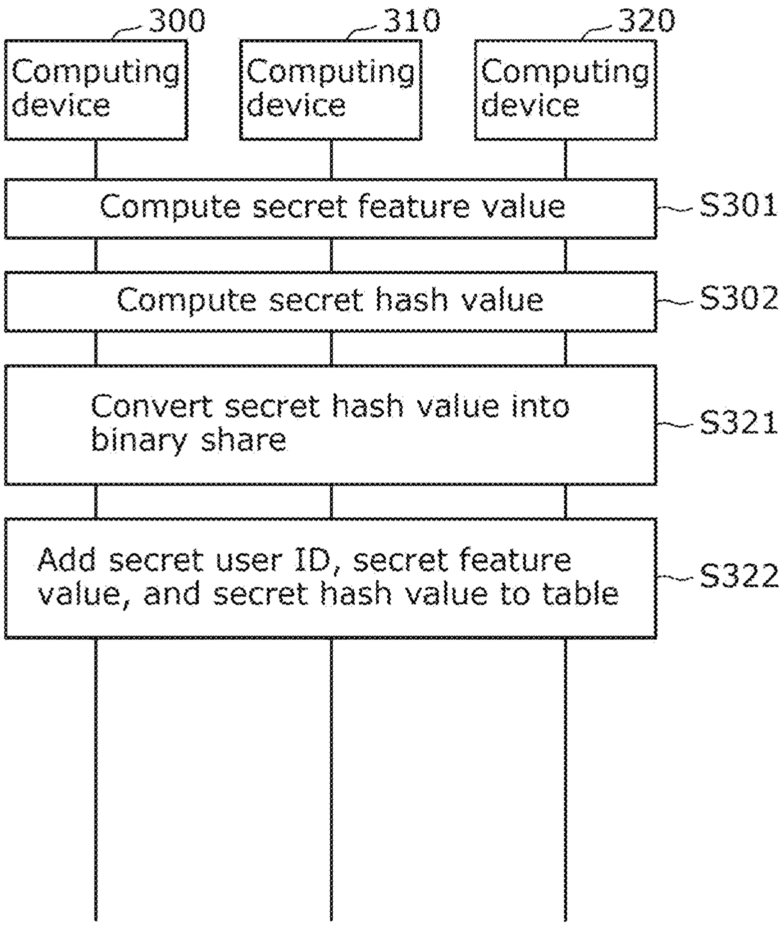
FIG. 16 is a sequence chart illustrating registration processing according to Variation 2.

FIG. 16 is a sequence chart illustrating the registration processing (S204) according to Variation 2. First, as in the example in FIG. 8, computing devices 300, 310, and 320 compute the secret feature value (S301), and then compute the secret hash value (S302).

Next, computing devices 300, 310, and 320 convert the secret hash value from an integer share to a binary share (S321). Computing devices 300, 310, and 320 then store the secret user ID, the secret feature value, and the secret hash value by adding the secret user ID, the secret feature value, and the secret hash value to the table (S322).

The operations in the authentication phase according to Variation 2 are the same as the operations in the authentication phase illustrated in FIG. 9. The authentication processing according to Variation 2 is basically the same as the authentication processing illustrated in FIG. 10. However, the processing of converting each secret hash value in the table from an integer share to a binary share is omitted.

As described above, in Variation 2, the processing of converting the secret hash values in the table into binary shares each time the authentication processing is performed can be omitted. This accelerates the authentication processing.

Variation 3

In Variation 3, processing for computing the feature value from the face image is performed in terminal device 100 or authentication device 400, rather than computing devices 300, 310, and 320.

Figure 17:
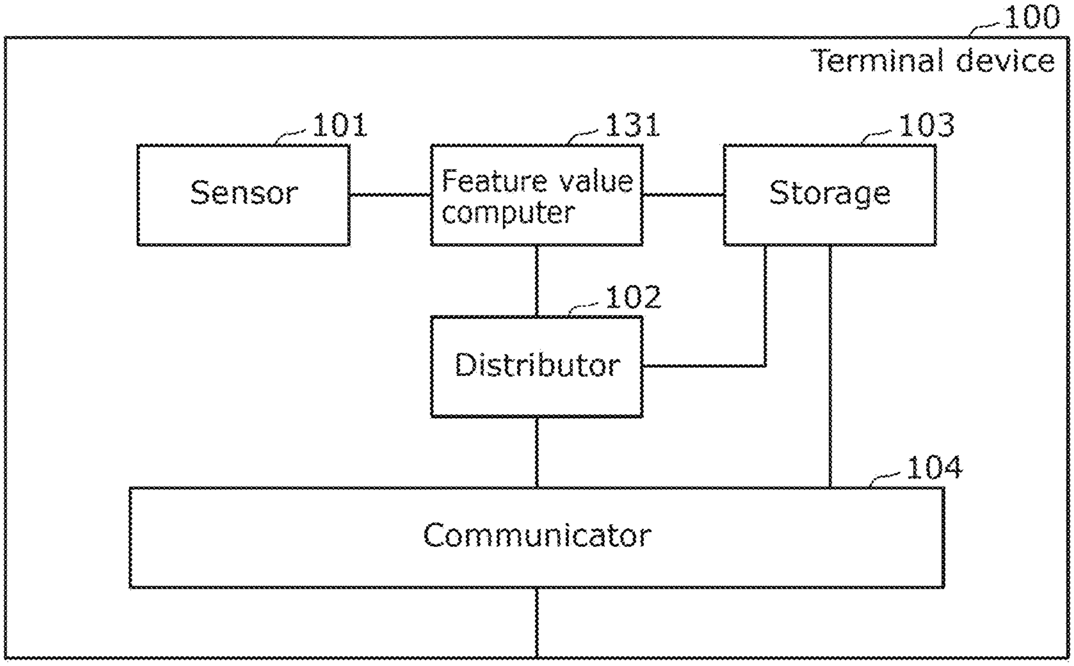
FIG. 17 is a block diagram illustrating the configuration of a terminal device according to Variation 3.

FIG. 17 is a block diagram illustrating the configuration of terminal device 100 according to Variation 3. Compared to the example in FIG. 2, terminal device 100 according to Variation 3 further includes feature value computer 131.

Feature value computer 131 is processing circuitry that computes a feature value from biometric information. Specifically, feature value computer 131 computes the feature value based on the face image and a feature value learning model. More specifically, feature value computer 131 derives the feature value from the face image through the feature value learning model.

Compared to the example in FIG. 2, terminal device 100 according to Variation 3 performs the following processing. Distributor 102 derives the secret feature value by encrypting the feature value computed by feature value computer 131, instead of the face image. The feature value learning model sent from provision device 200 is stored in storage 103. Communicator 104 receives the feature value learning model from provision device 200.

Figure 18:
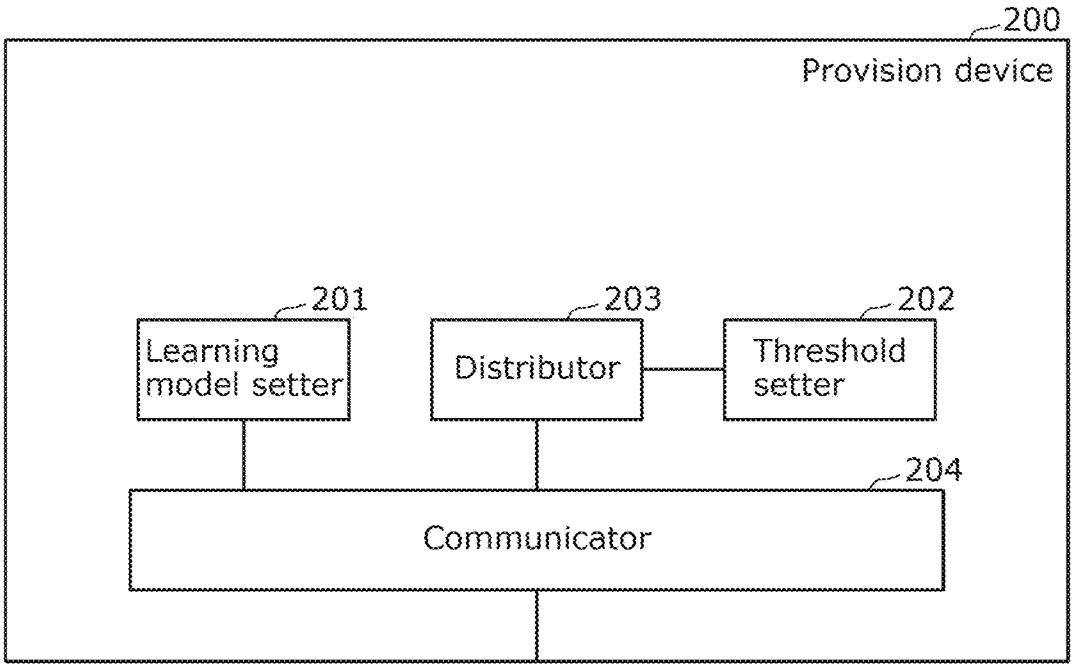
FIG. 18 is a block diagram illustrating the configuration of a provision device according to Variation 3.

FIG. 18 is a block diagram illustrating the configuration of provision device 200 according to Variation 3. Provision device 200 according to Variation 3 includes the same constituent elements as those of provision device 200 illustrated in FIG. 3. However, the feature value learning model set and the HashNet learning model set by learning model setter 201 are sent to terminal device 100 and authentication device 400 through communicator 204 without being encrypted by distributor 203.

Figure 19:
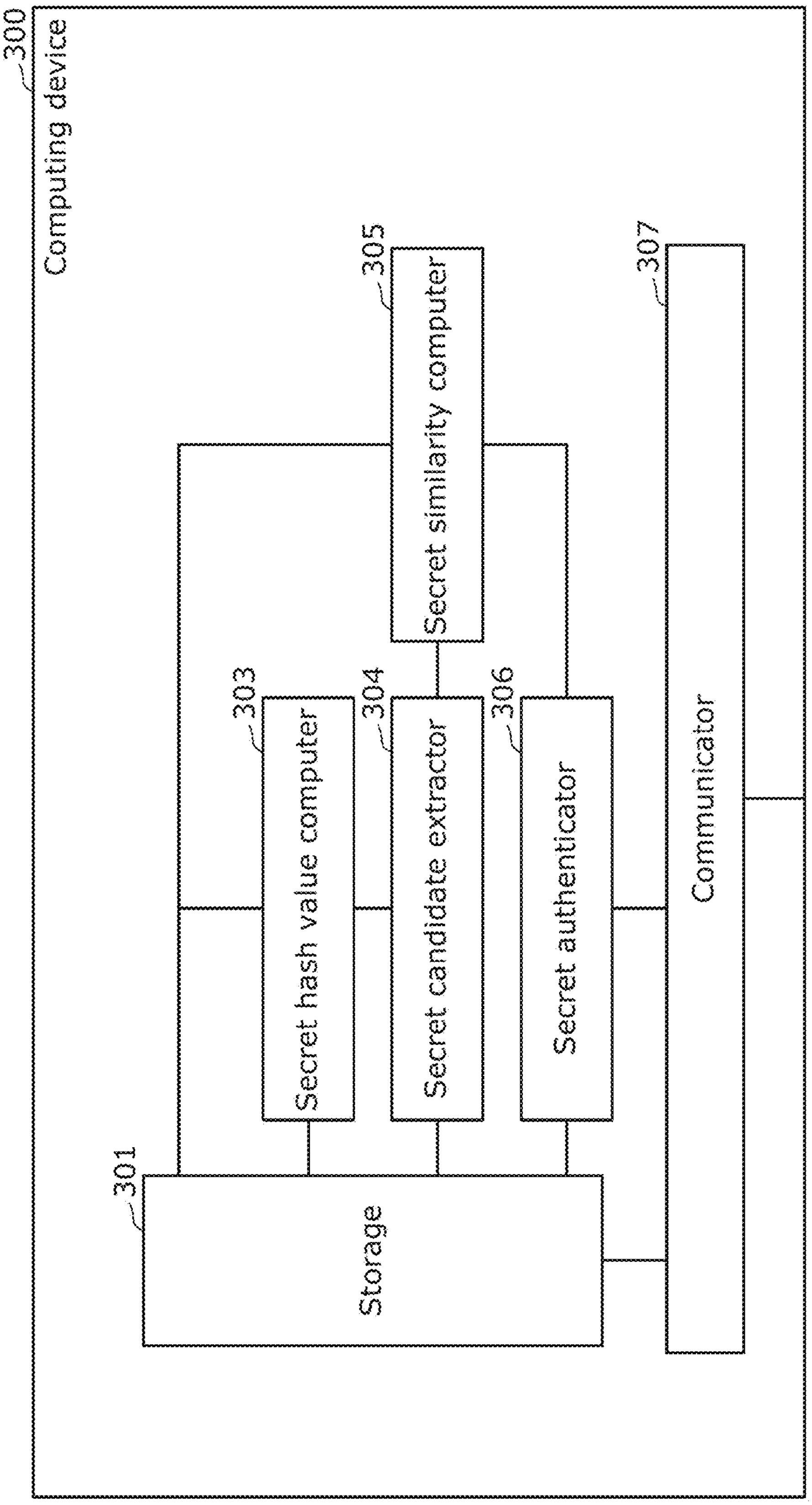
FIG. 19 is a block diagram illustrating the configuration of a computing device according to Variation 3.

FIG. 19 is a block diagram illustrating the configuration of computing device 300 according to Variation 3. Computing devices 310 and 320 also include the same plurality of constituent elements as those of computing device 300. Compared to the example in FIG. 4, computing device 300 in Variation 3 does not include secret feature value computer 302. In other words, the configuration related to computing feature values has been removed.

The secret feature value sent from terminal device 100 or authentication device 400 is stored in storage 301. Secret hash value computer 303 computes the secret hash value from the secret feature value sent from terminal device 100 or authentication device 400. Secret similarity computer 305 computes a secret similarity between each of the at least one secret feature value candidates and the secret feature value sent from terminal device 100 or authentication device 400. Communicator 307 receives the secret feature value from terminal device 100 and authentication device 400.

Figure 20:
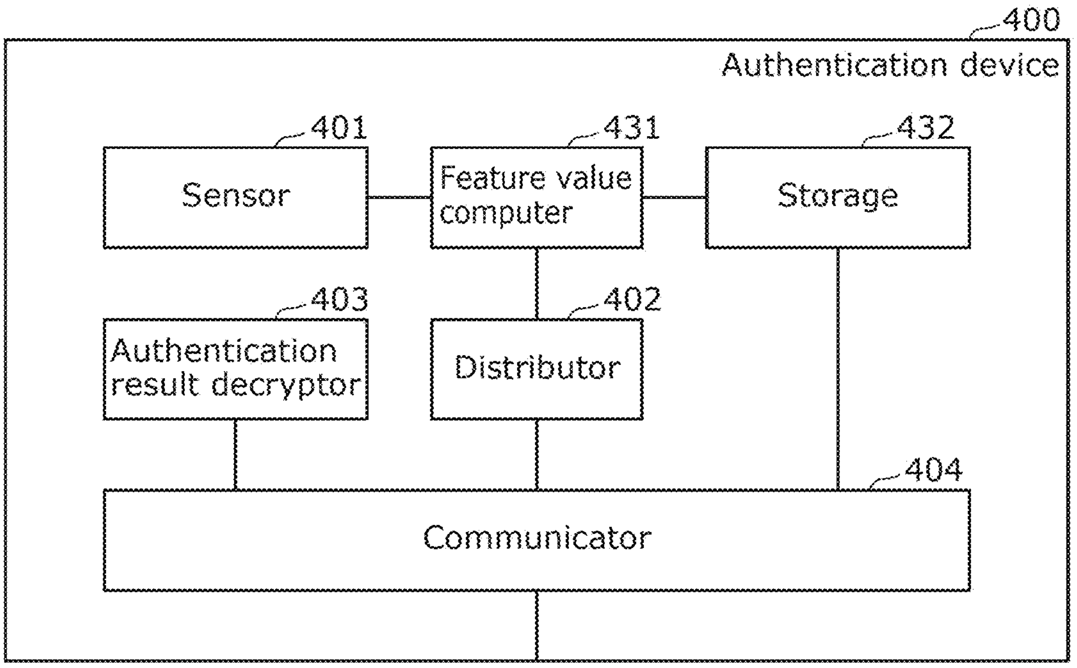
FIG. 20 is a block diagram illustrating the configuration of an authentication device according to Variation 3.

FIG. 20 is a block diagram illustrating the configuration of authentication device 400 according to Variation 3. Compared to the example in FIG. 5, authentication device 400 according to Variation 3 further includes feature value computer 431 and storage 432.

Feature value computer 431 is processing circuitry that computes a feature value from biometric information. Specifically, feature value computer 431 computes the feature value based on the face image and a feature value learning model. More specifically, feature value computer 431 derives the feature value from the face image through the feature value learning model.

Storage 432 is a memory for storing information. Storage 432 may be a volatile memory or a non-volatile memory. Specifically, the feature value learning model sent from provision device 200 is stored in storage 432.

Compared to the example in FIG. 5, authentication device 400 according to Variation 3 performs the following processing. Distributor 402 derives the secret feature value by encrypting the feature value computed by feature value computer 431, instead of the face image. Communicator 404 receives the feature value learning model from provision device 200.

Figure 21:
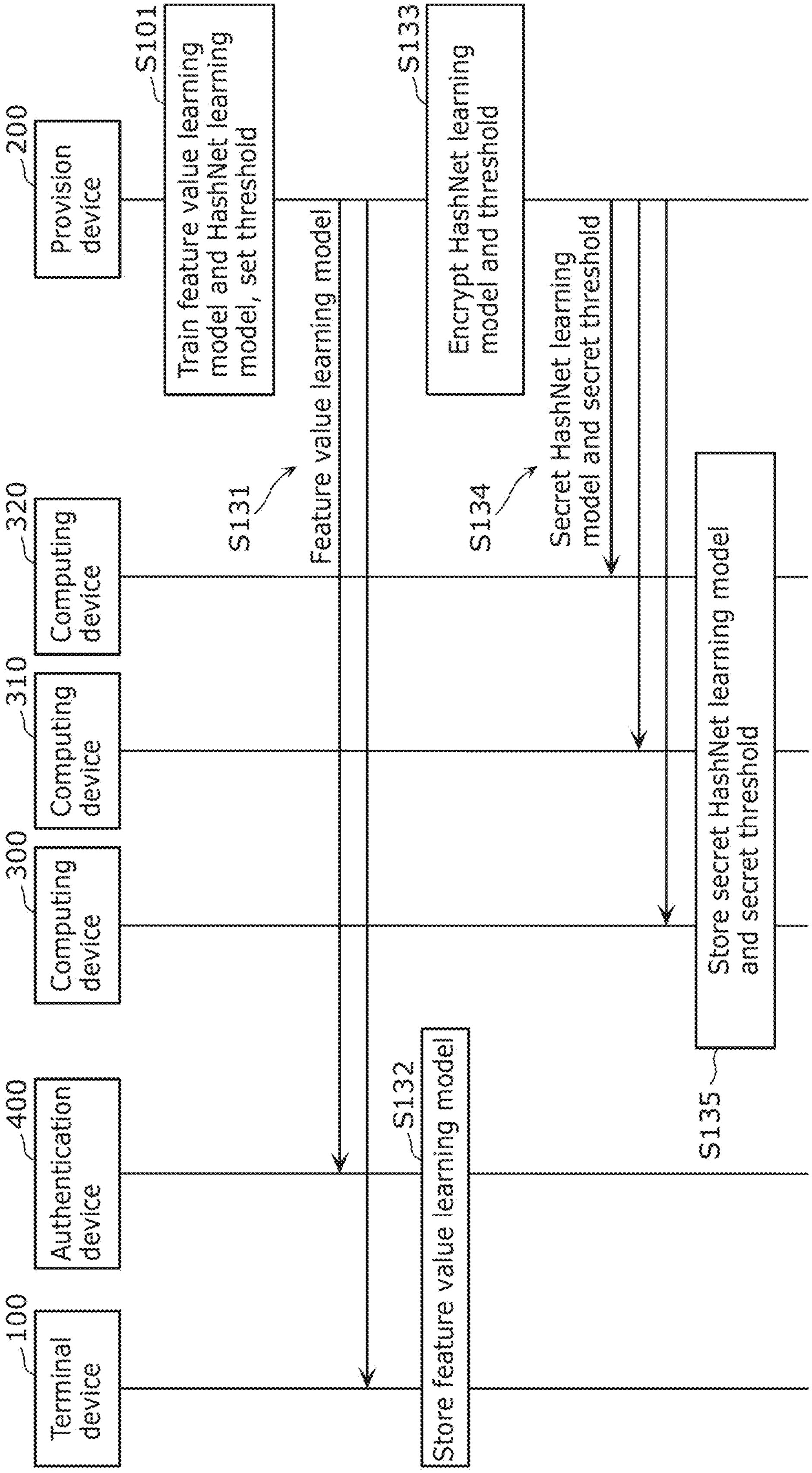
FIG. 21 is a sequence chart illustrating operations in an initialization phase according to Variation 3.

FIG. 21 is a sequence chart illustrating operations in the initialization phase according to Variation 3. First, as in the example in FIG. 6, provision device 200 trains the feature value learning model and the HashNet learning model, and sets a threshold (S101).

Next, provision device 200 sends the feature value learning model to terminal device 100 and authentication device 400 (S131). Both terminal device 100 and authentication device 400 store the feature value learning model (S132).

Next, provision device 200 encrypts the HashNet learning model and the threshold based on the secret sharing scheme, and derives the secret HashNet learning model and the secret threshold (S133). Provision device 200 then sends the secret HashNet learning model and the secret threshold to computing devices 300, 310, and 320 (S134).

Computing devices 300, 310, and 320 store the secret HashNet learning model and the secret threshold (S135).

Figure 22:
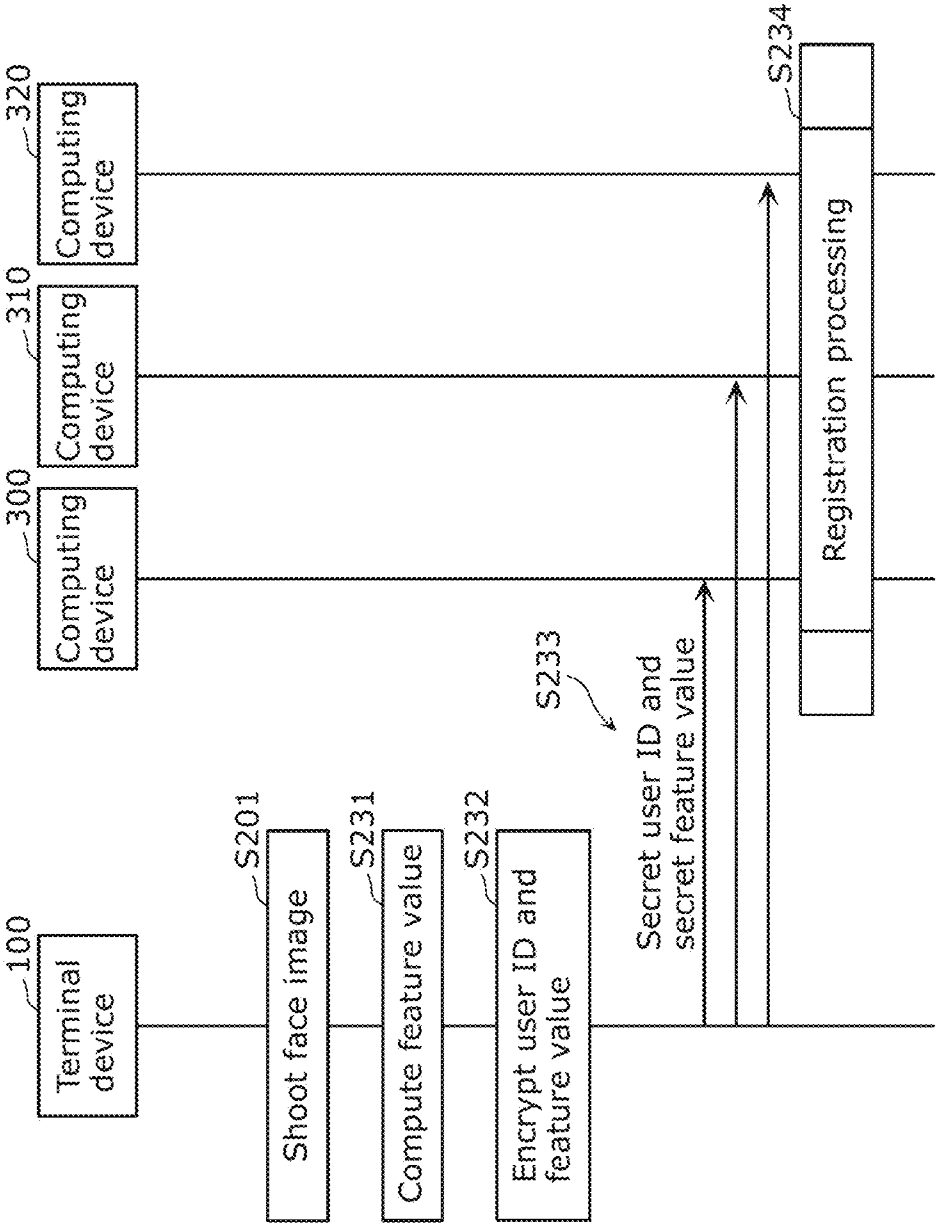
FIG. 22 is a sequence chart illustrating operations in a registration phase according to Variation 3.

FIG. 22 is a sequence chart illustrating operations in the registration phase according to Variation 3. First, as in the example in FIG. 7, terminal device 100 shoots a face image of the user (S201).

Next, terminal device 100 computes a feature value based on the face image and the feature value learning model (S231). More specifically, terminal device 100 derives the feature value from the face image through the feature value learning model.

Next, terminal device 100 derives the secret user ID and the secret feature value by encrypting the user ID and the feature value (S232). Terminal device 100 then sends the secret user ID and the secret feature value to computing devices 300, 310, and 320 (S233).

Computing devices 300, 310, and 320 perform registration processing based on the secret user ID and the secret feature value (S234).

Figure 23:
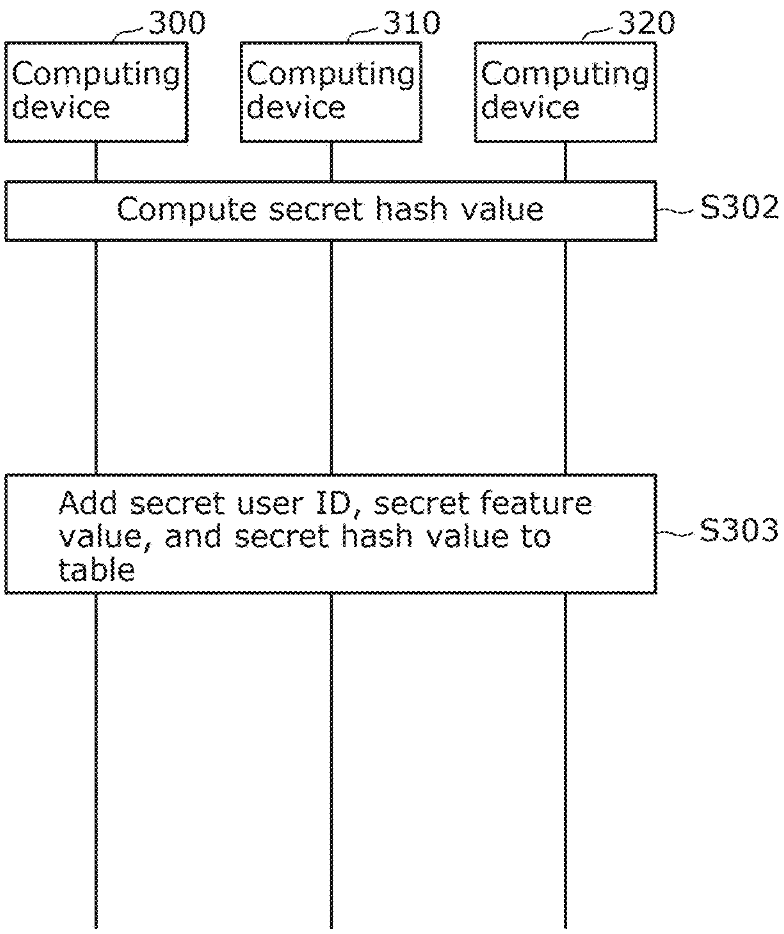
FIG. 23 is a sequence chart illustrating registration processing according to Variation 3.

FIG. 23 is a sequence chart illustrating the registration processing (S234) according to Variation 3. Compared to the example in FIG. 8, computing devices 300, 310, and 320 omit the computation of the secret feature value, and use the secret feature value sent from terminal device 100 to compute the secret hash value (S302). Specifically, computing devices 300, 310, and 320 derive the secret hash value from the secret feature value through the secret HashNet learning model.

Additionally, as in the example in FIG. 8, computing devices 300, 310, and 320 store the secret user ID, the secret feature value, and the secret hash value by adding the secret user ID, the secret feature value, and the secret hash value to the table (S303).

Figure 24:
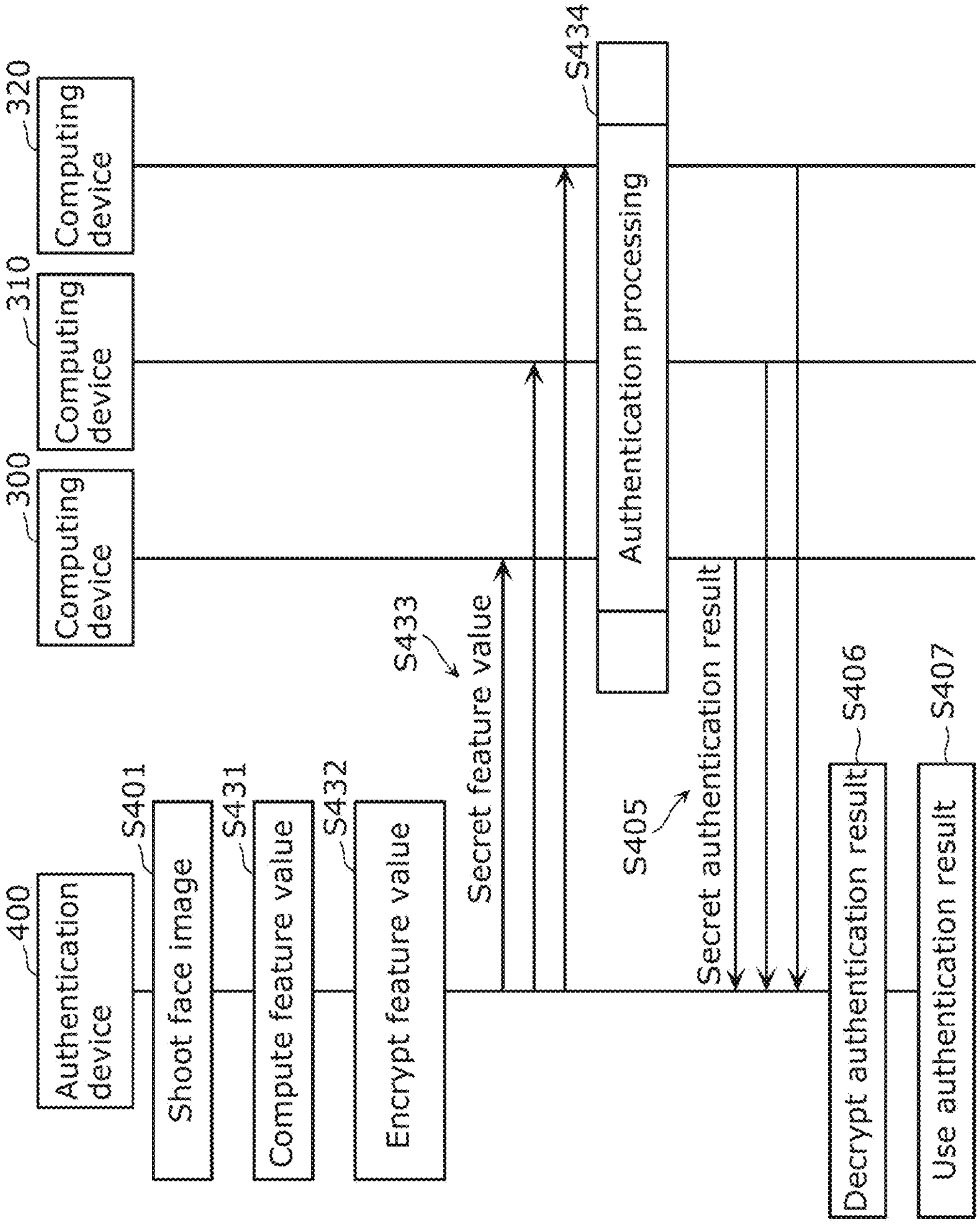
FIG. 24 is a sequence chart illustrating operations in an authentication phase according to Variation 3.

FIG. 24 is a sequence chart illustrating operations in the authentication phase according to Variation 3. First, as in the example in FIG. 9, authentication device 400 shoots a face image of the user (S401).

Next, authentication device 400 computes a feature value based on the face image and the feature value learning model (S431). More specifically, authentication device 400 derives the feature value from the face image through the feature value learning model.

Next, authentication device 400 derives the secret feature value by encrypting the face image (S432). Authentication device 400 then sends the secret feature value to computing devices 300, 310, and 320 (S433). Computing devices 300, 310, and 320 perform the authentication processing based on the secret feature value (S434).

Then, as in the example in FIG. 9, computing devices 300, 310, and 320 send the secret authentication result to authentication device 400 (S405). Authentication device 400 decrypts the authentication result (S406) and uses the authentication result (S407).

Figure 25:
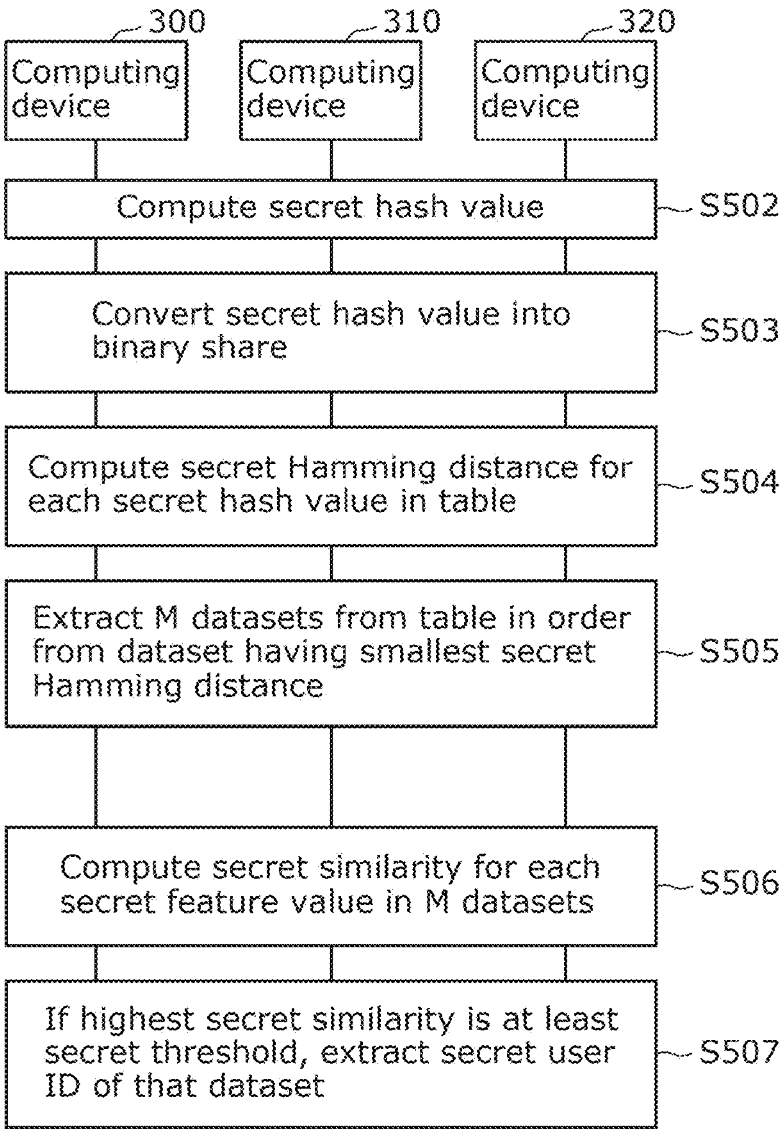
FIG. 25 is a sequence chart illustrating authentication processing according to Variation 3.

FIG. 25 is a sequence chart illustrating the authentication processing (S434) according to Variation 3. Compared to the example in FIG. 10, computing devices 300, 310, and 320 omit the computation of the secret feature value, and use the secret feature value sent from authentication device 400 to compute the secret hash value (S502). Specifically, computing devices 300, 310, and 320 derive the secret hash value from the secret feature value through the secret HashNet learning model.

The subsequent processing (S503 to S507) is also the same as the example in FIG. 10, except that instead of computing the secret feature value, the secret feature value sent from authentication device 400 is used.

As described above, in Variation 3, processing for computing the feature value from the face image is performed in terminal device 100 or authentication device 400, rather than computing devices 300, 310, and 320. This makes it possible to quickly compute the feature value used in the authentication processing from the face image, without a secure computation based on the secret sharing scheme. This in turn makes it possible to accelerate the authentication processing.

Variation 4

In Variation 4, the processing for computing the feature value from the face image is divided into a previous stage and a following stage. In other words, terminal device 100 and authentication device 400 compute a previous-stage feature value from the face image. Computing devices 300, 310, and 320 then compute a following-stage feature value from the previous-stage feature value.

Figure 26:
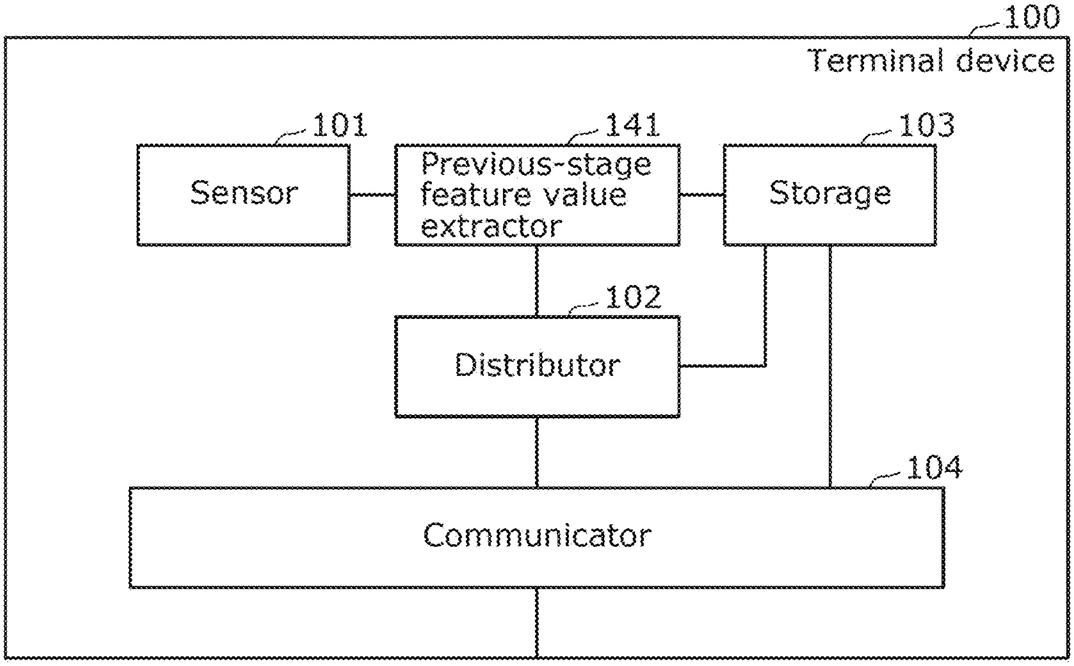
FIG. 26 is a block diagram illustrating the configuration of a terminal device according to Variation 4.

FIG. 26 is a block diagram illustrating the configuration of terminal device 100 according to Variation 4. Compared to the example in FIG. 2, terminal device 100 according to Variation 4 further includes previous-stage feature value computer 141.

Previous-stage feature value computer 141 is processing circuitry that computes a feature value from biometric information. Specifically, previous-stage feature value computer 141 computes the previous-stage feature value based on the face image and a previous-stage feature value learning model. More specifically, previous-stage feature value computer 141 derives the previous-stage feature value from the face image through the previous-stage feature value learning model.

Compared to the example in FIG. 2, terminal device 100 according to Variation 4 performs the following processing. Distributor 102 derives a secret previous-stage feature value by encrypting the previous-stage feature value computed by previous-stage feature value computer 141, instead of the face image. The previous-stage feature value learning model sent from provision device 200 is stored in storage 103. Communicator 104 receives the previous-stage feature value learning model from provision device 200.

Figure 27:
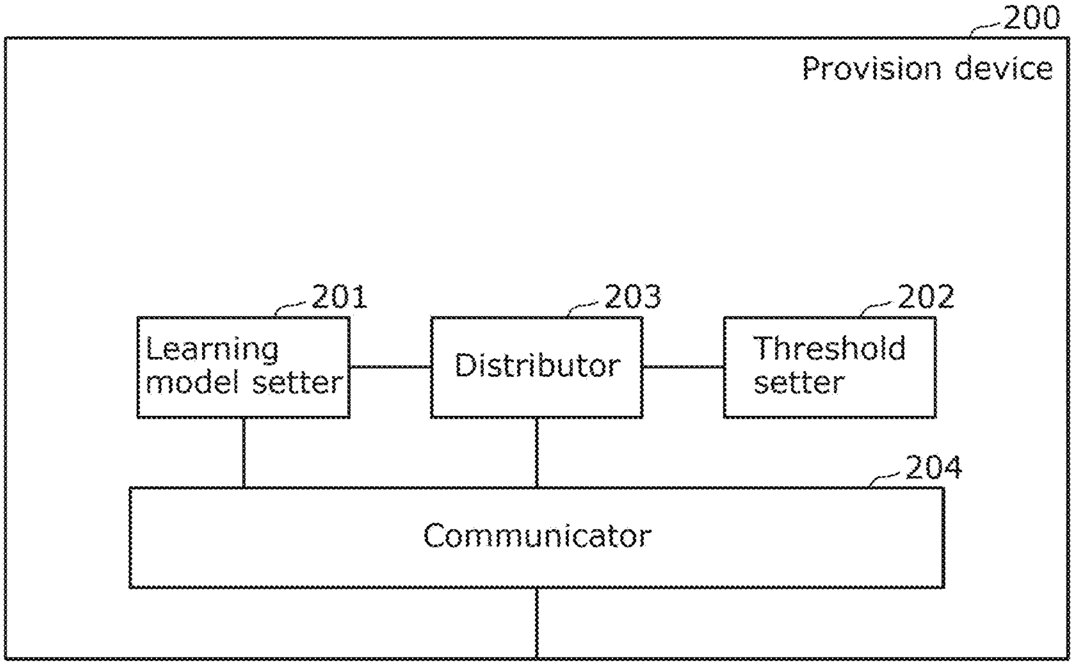
FIG. 27 is a block diagram illustrating the configuration of a provision device according to Variation 4.

FIG. 27 is a block diagram illustrating the configuration of provision device 200 according to Variation 4. Provision device 200 according to Variation 4 includes the same constituent elements as those of provision device 200 illustrated in FIG. 3.

However, learning model setter 201 trains the previous-stage feature value learning model, a following-stage feature value learning model, and the HashNet learning model.

The previous-stage feature value learning model is a learning model for deriving the previous-stage feature value from the biometric information, and the following-stage feature value learning model is a learning model for deriving the following-stage feature value from the previous-stage feature value. The hash value is computed from the previous-stage feature value. The following-stage feature value is used to determine whether authentication is successful.

Learning model setter 201 trains the previous-stage feature value learning model and the following-stage feature value learning model such that a following-stage feature value for which the success or failure of the authentication is accurately determined is derived from the face image.

Distributor 203 derives a secret following-stage feature value learning model, a secret HashNet learning model, and a secret threshold by encrypting the following-stage feature value learning model, the HashNet learning model, and the threshold. The previous-stage feature value learning model set by learning model setter 201 is sent to terminal device 100 and authentication device 400 through communicator 204 without being encrypted by distributor 203.

Communicator 204 sends the secret following-stage feature value learning model, the secret HashNet learning model, and the secret threshold to computing devices 300, 310, and 320. Communicator 204 also sends the previous-stage feature value learning model to terminal device 100 and authentication device 400.

Figure 28:
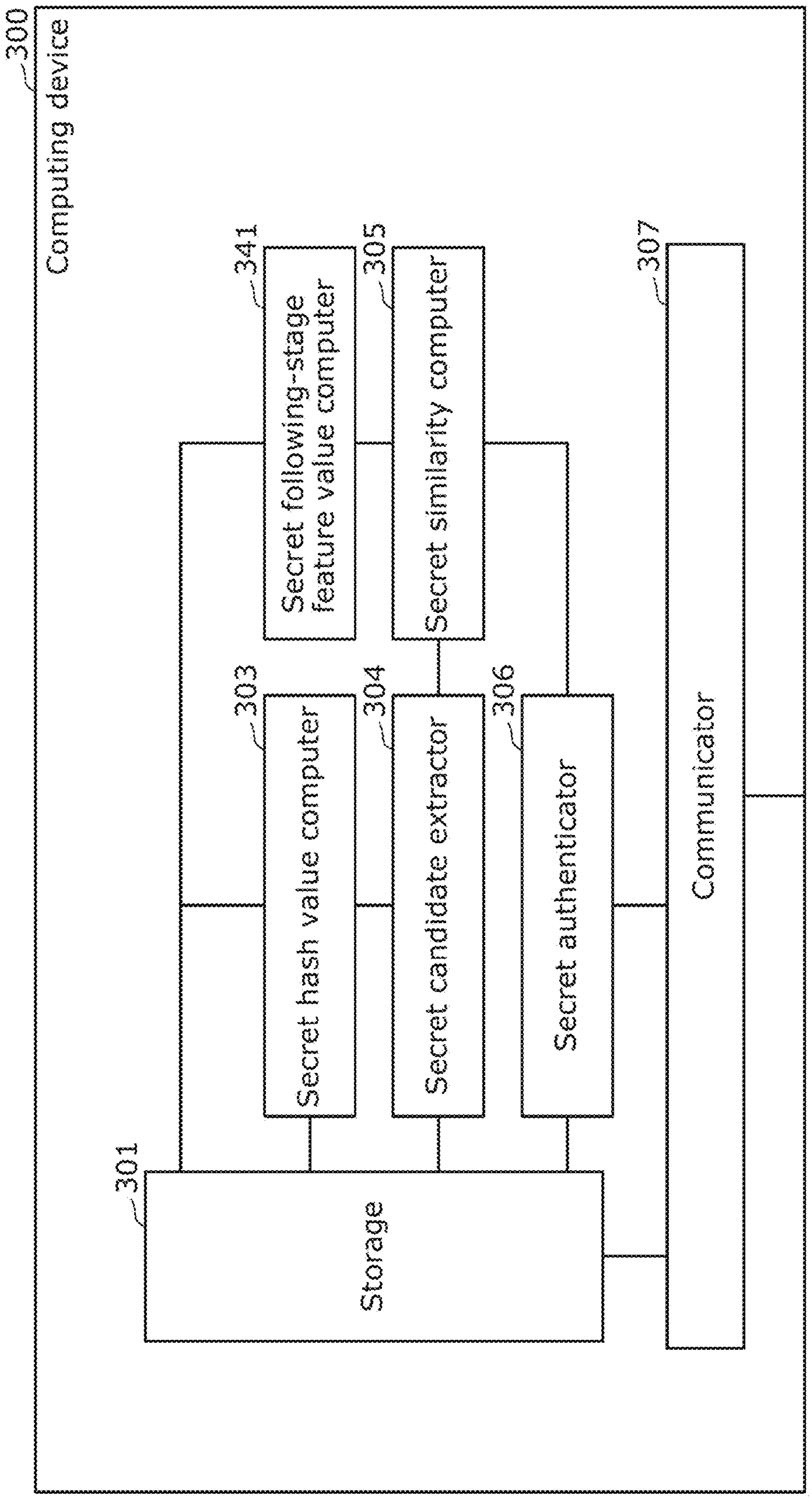
FIG. 28 is a block diagram illustrating the configuration of a computing device according to Variation 4.

FIG. 28 is a block diagram illustrating the configuration of computing device 300 according to Variation 4. Computing devices 310 and 320 also include the same plurality of constituent elements as those of computing device 300. Compared to the example in FIG. 4, computing device 300 in Variation 4 includes secret following-stage feature value computer 341 instead of secret feature value computer 302.

Secret following-stage feature value computer 341 is processing circuitry that performs secure computations based on the secret sharing scheme in computing devices 300, 310, and 320. Specifically, secret following-stage feature value computer 341 computes the following-stage feature value from the previous-stage feature value. More specifically, secret following-stage feature value computer 341 derives a secret following-stage feature value from the secret previous-stage feature value sent from terminal device 100 or authentication device 400, through the secret following-stage feature value learning model sent from provision device 200.

Additionally, compared to the example in FIG. 4, the secret previous-stage feature value is stored in storage 301 instead of the face image, and the secret following-stage feature value is stored instead of the secret feature value.

Additionally, compared to the example in FIG. 4, secret hash value computer 303 computes the secret hash value from the secret previous-stage feature value sent from terminal device 100 or authentication device 400. Secret candidate extractor 304 uses the secret following-stage feature value (a secret following-stage feature value candidate) instead of the secret feature value (the secret feature value candidate). Secret similarity computer 305 computes a secret similarity between each of at least one secret following-stage feature value candidate and the secret following-stage feature value computed by secret following-stage feature value computer 341.

Additionally, compared to the example in FIG. 4, communicator 307 receives the secret feature value from terminal device 100 and authentication device 400, and receives the following-stage feature value learning model instead of the feature value learning model from provision device 200.

Figure 29:
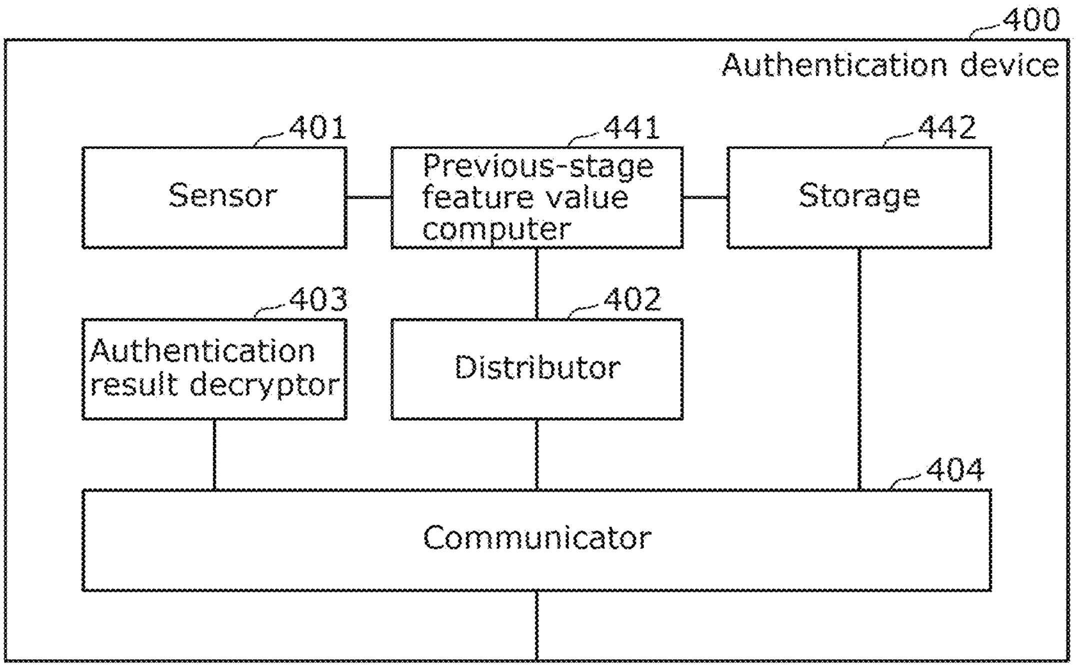
FIG. 29 is a block diagram illustrating the configuration of an authentication device according to Variation 4.

FIG. 29 is a block diagram illustrating the configuration of authentication device 400 according to Variation 4. Compared to the example in FIG. 5, authentication device 400 according to Variation 4 further includes previous-stage feature value computer 441 and storage 442.

Previous-stage feature value computer 441 is processing circuitry that computes a feature value from biometric information. Specifically, previous-stage feature value computer 441 computes the previous-stage feature value based on the face image and a previous-stage feature value learning model. More specifically, previous-stage feature value computer 441 derives the previous-stage feature value from the face image through the previous-stage feature value learning model.

Storage 442 is a memory for storing information. Storage 442 may be a volatile memory or a non-volatile memory. Specifically, the previous-stage feature value learning model sent from provision device 200 is stored in storage 442.

Compared to the example in FIG. 5, authentication device 400 according to Variation 4 performs the following processing. Distributor 402 derives a secret previous-stage feature value by encrypting the previous-stage feature value computed by previous-stage feature value computer 441, instead of the face image. Communicator 404 receives the previous-stage feature value learning model from provision device 200.

Figure 30:
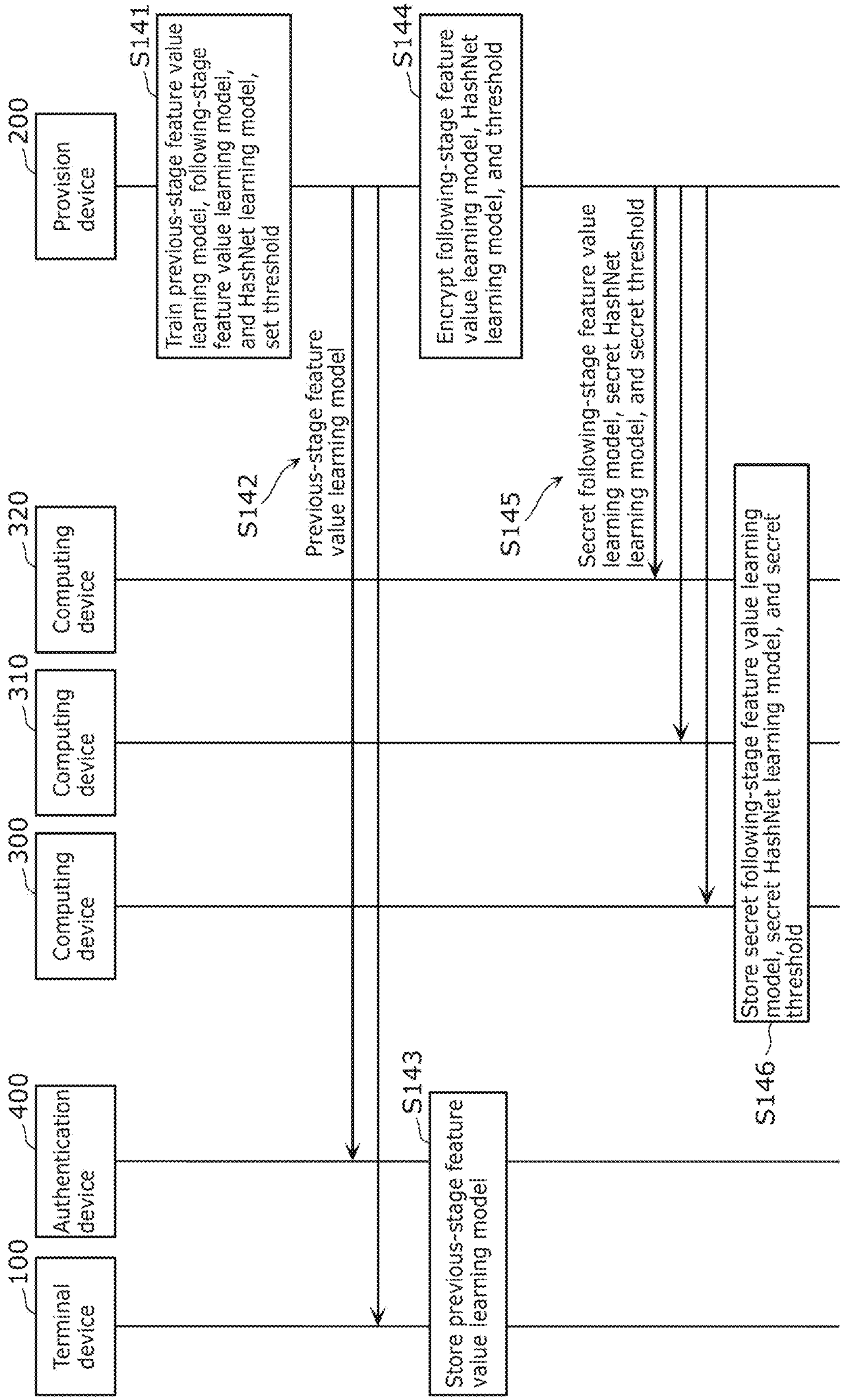
FIG. 30 is a sequence chart illustrating operations in an initialization phase according to Variation 4.

FIG. 30 is a sequence chart illustrating operations in the initialization phase according to Variation 4. First, provision device 200 trains the previous-stage feature value learning model, the following-stage feature value learning model, and the HashNet learning model using training data collected in advance. In addition, provision device 200 sets a threshold for determining whether authentication is successful (S141).

Next, provision device 200 sends the previous-stage feature value learning model to terminal device 100 and authentication device 400 (S142). Both terminal device 100 and authentication device 400 store the previous-stage feature value learning model (S143).

Next, provision device 200 derives the secret following-stage feature value learning model, the secret HashNet learning model, and the secret threshold by encrypting the following-stage feature value learning model, the HashNet learning model, and the threshold based on the secret sharing scheme (S144). Provision device 200 then sends the secret following-stage feature value learning model, the secret HashNet learning model, and the secret threshold to computing devices 300, 310, and 320 (S145).

Computing devices 300, 310, and 320 store the secret following-stage feature value learning model, the secret HashNet learning model, and the secret threshold (S146).

Figure 31:
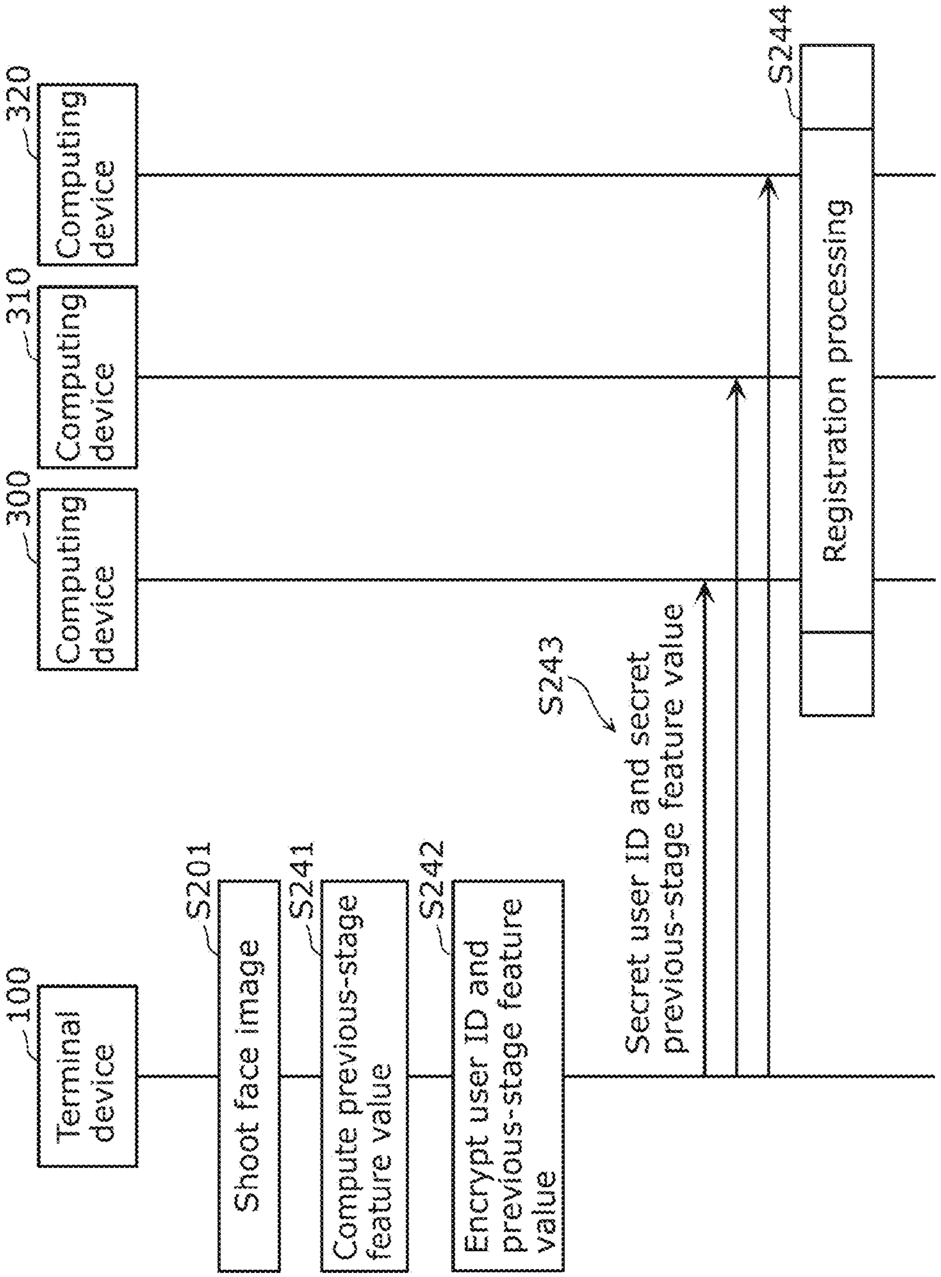
FIG. 31 is a sequence chart illustrating operations in a registration phase according to Variation 4.

FIG. 31 is a sequence chart illustrating operations in the registration phase according to Variation 4. First, as in the example in FIG. 7, terminal device 100 shoots a face image of the user (S201).

Next, terminal device 100 computes a previous-stage feature value based on the face image and the previous-stage feature value learning model (S241). More specifically, terminal device 100 derives the previous-stage feature value from the face image through the previous-stage feature value learning model.

Next, terminal device 100 derives the secret user ID and the secret previous-stage feature value by encrypting the user ID and the previous-stage feature value (S242). Terminal device 100 then sends the secret user ID and the secret previous-stage feature value to computing devices 300, 310, and 320 (S243).

Computing devices 300, 310, and 320 perform registration processing based on the secret user ID and the secret previous-stage feature value (S244).

Figure 32:
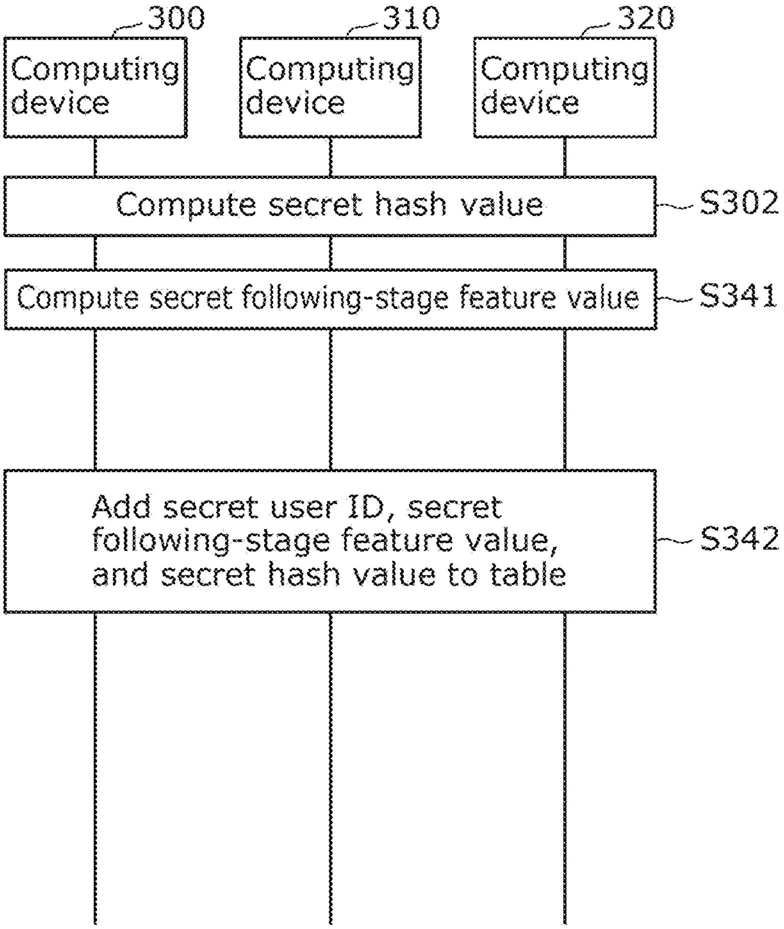
FIG. 32 is a sequence chart illustrating registration processing according to Variation 4.

FIG. 32 is a sequence chart illustrating the registration processing (S244) according to Variation 4. Compared to the example in FIG. 8, computing devices 300, 310, and 320 omit the computation of the secret feature value, and use the secret previous-stage feature value sent from terminal device 100 to compute the secret hash value (S302). Specifically, computing devices 300, 310, and 320 derive the secret hash value from the secret previous-stage feature value through the secret HashNet learning model.

Next, computing devices 300, 310, and 320 compute the secret following-stage feature value (S341). Specifically, computing devices 300, 310, and 320 derive the secret following-stage feature value from the secret previous-stage feature value through the secret following-stage feature value learning model.

Computing devices 300, 310, and 320 then store the secret user ID, the secret following-stage feature value, and the secret hash value by adding the secret user ID, the secret following-stage feature value, and the secret hash value to the table (S342).

Figure 33:
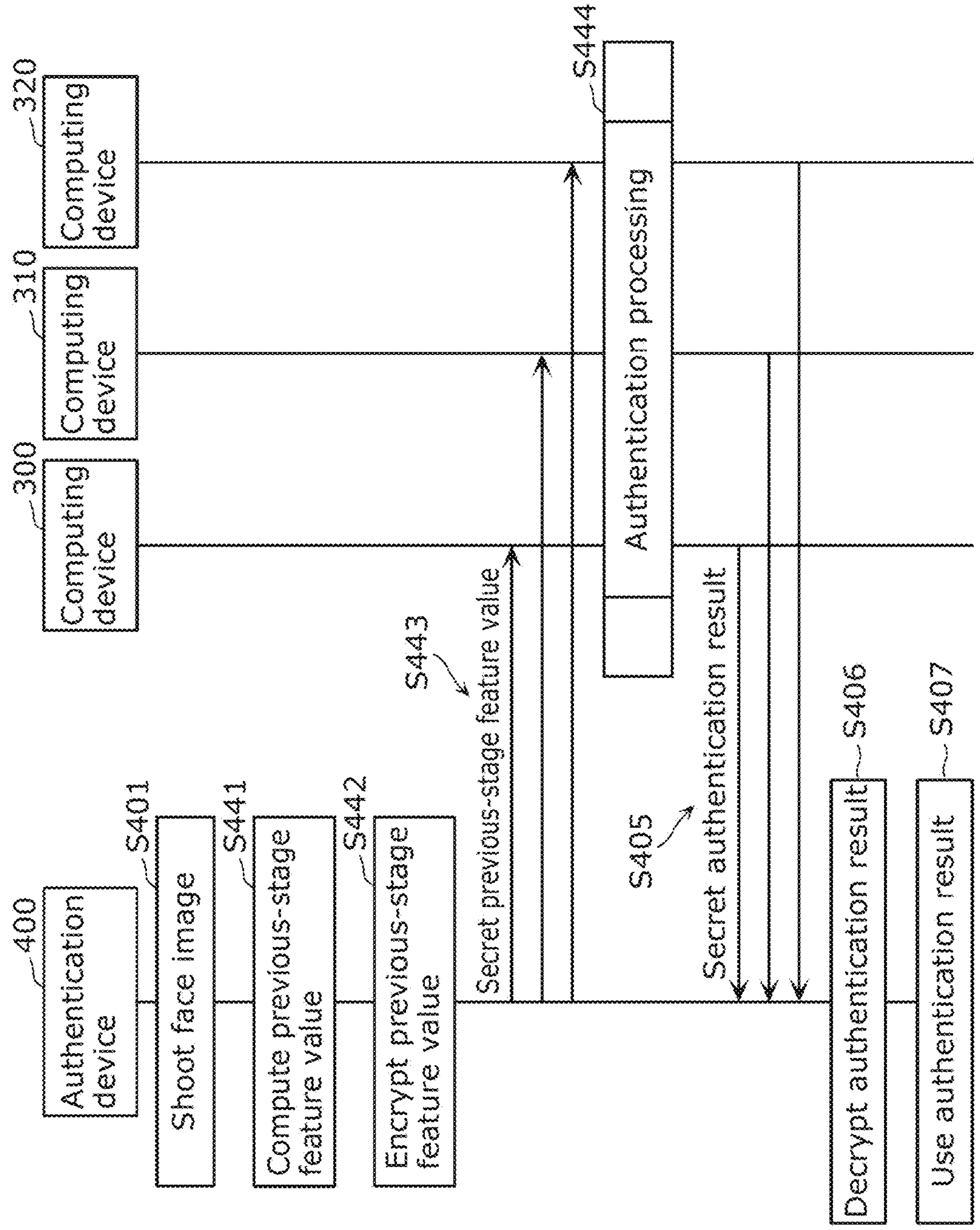
FIG. 33 is a sequence chart illustrating operations in an authentication phase according to Variation 4.

FIG. 33 is a sequence chart illustrating operations in the authentication phase according to Variation 4. First, as in the example in FIG. 9, authentication device 400 shoots a face image of the user (S401).

Next, authentication device 400 computes a previous-stage feature value based on the face image and the previous-stage feature value learning model (S441). More specifically, authentication device 400 derives the previous-stage feature value from the face image through the previous-stage feature value learning model.

Next, authentication device 400 derives a secret previous-stage feature value by encrypting the previous-stage feature value (S442). Authentication device 400 then sends the secret previous-stage feature value to computing devices 300, 310, and 320 (S443). Computing devices 300, 310, and 320 perform the authentication processing based on the secret previous-stage feature value (S444).

Then, as in the example in FIG. 9, computing devices 300, 310, and 320 send the secret authentication result to authentication device 400 (S405). Authentication device 400 decrypts the authentication result (S406) and uses the authentication result (S407).

Figure 34:
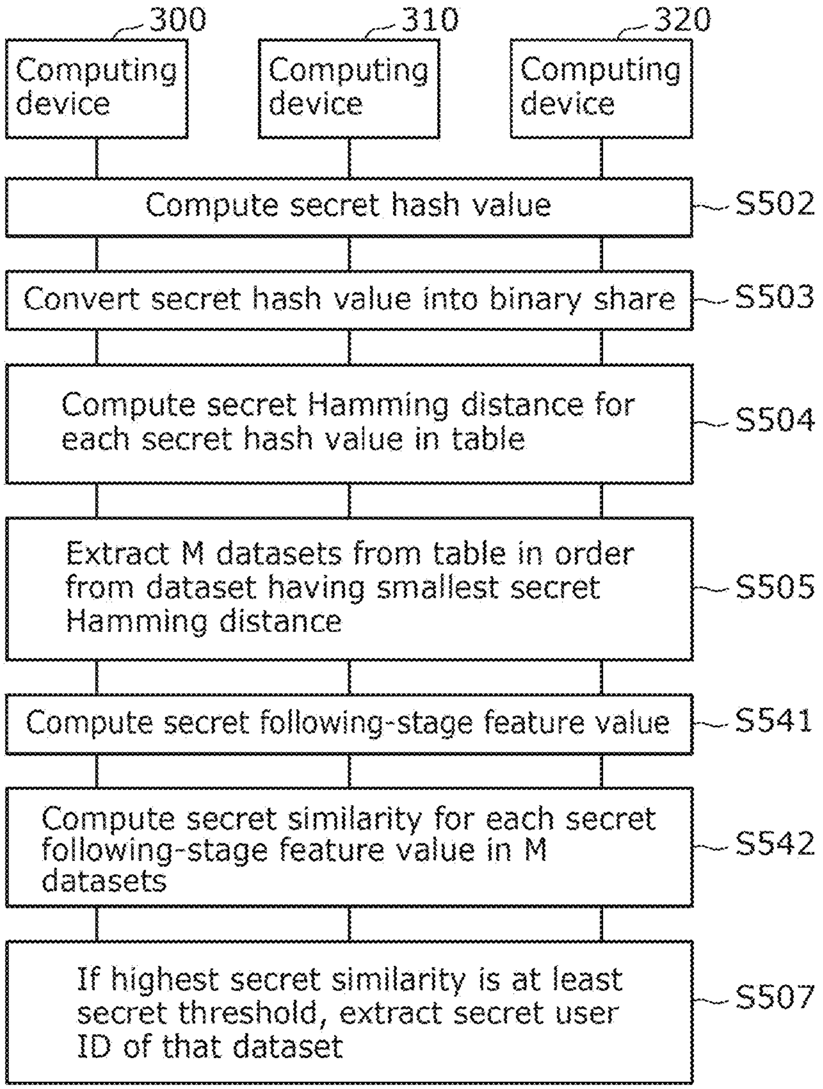
FIG. 34 is a sequence chart illustrating authentication processing according to Variation 4.

FIG. 34 is a sequence chart illustrating the authentication processing (S444) according to Variation 4. Compared to the example in FIG. 10, computing devices 300, 310, and 320 omit the computation of the secret feature value, and compute the secret hash value (S502). Specifically, computing devices 300, 310, and 320 derive the secret hash value from the secret previous-stage feature value through the secret HashNet learning model.

Next, as in the example in FIG. 10, computing devices 300, 310, and 320 convert the secret hash value from an integer share to a binary share (S503). Computing devices 300, 310, and 320 also convert each secret hash value in the table from an integer share to a binary share.

Next, as in the example in FIG. 10, computing devices 300, 310, and 320 compute the secret Hamming distance between the secret hash value corresponding to the data to be authenticated and each secret hash value in the table (S504)

Next, as in the example in FIG. 10, computing devices 300, 310, and 320 extract M datasets from the table in order from the smallest secret Hamming distance (S505).

Next, computing devices 300, 310, and 320 compute the secret following-stage feature value (S541). Specifically, computing devices 300, 310, and 320 derive the secret following-stage feature value from the secret previous-stage feature value through the secret following-stage feature value learning model.

Next, computing devices 300, 310, and 320 compute a secret similarity between the secret following-stage feature value corresponding to the data to be authenticated and each secret following-stage feature value in the M datasets. In other words, computing devices 300, 310, and 320 compute M secret similarities for the M secret following-stage feature values (M secret following-stage feature value candidates) in the M datasets (S542).

Specifically, in the secret state in the first integer share, computing devices 300, 310, and 320 compute, by a secure computation, the similarity between the following-stage feature value corresponding to the data to be authenticated and the following-stage feature value in each of the M datasets. The similarity increases the more the two feature values resemble each other. The similarity may correspond to a Euclidean distance, a cosine similarity, or a value obtained by processing these. The similarity may also correspond to a value called a "distance score".

Then, as in the example in FIG. 10, if the highest secret similarity is at least a secret threshold, computing devices 300, 310, and 320 extract the secret user ID in that dataset (S507).

As described above, in Variation 4, the processing for computing the feature value from the face image is divided into a previous stage and a following stage. This makes it possible to compute the feature value quickly, and the feature value and the processing for deriving the feature value can be made secret in a more reliable manner.

Other Variations

Before the feature value corresponding to the data to be authenticated is obtained in the authentication phase, an intermediate value used to compute the similarity may be computed and registered (stored) in the registration phase. The similarity may then be computed using the intermediate value registered (stored) in the authentication phase.

For example, if the feature value corresponding to the data to be authenticated is represented by $a=(a_0, a_1, \ldots, a_n)$ and the feature value stored in the table is represented by $b=(b_0, b_1, \ldots, b_n)$, a cosine similarity between the feature value a and the feature value b is computed through the following Formula (1).

$$\frac{\sum a_i b_i}{\sqrt{\sum a_i^2}\sqrt{\sum b_i^2}} \quad (1)$$

The following Formula (2) within Formula (1) can be computed before the feature value a is obtained.

$$\sqrt{\sum b_i^2} \tag{2}$$

Computing devices 300, 310, and 320 may register the intermediate value, which can be computed as described above, in the table during the registration processing. Then, in the authentication processing, computing devices 300, 310, and 320 may compute the similarity using the intermediate value registered in the table. This makes it possible to accelerate the authentication processing.

Additionally, terminal device 100 and authentication device 400 may be the same device. For example, terminal device 100 may perform operations for the authentication processing as authentication device 400, or authentication device 400 may perform operations for the registration processing as terminal device 100.

Additionally, the face image for the registration processing may be obtained from a passport, driver's license, a My Number card, or the like. In other words, the face image may be obtained from a medium in which the face image is recorded, rather than being obtained directly. Here, the medium may be an electrical or magnetic medium, or may be a medium such as paper. Likewise, the user ID for the registration processing may be obtained from a passport, driver's license, a My Number card, or the like.

The feature value learning model, the previous-stage feature value learning model, the following-stage feature value learning model, and the HashNet learning model need not be trained. In particular, if the model is not encrypted, an existing learning model may be used.

A plurality of constituent elements included in each device of authentication system 500 are constituted by circuitry, for example. Additionally, the plurality of constituent elements included in each device may be constituted by a processor and a memory.

Characteristic Configuration and Operations

A characteristic configuration and operations in the foregoing embodiment and multiple variations will be described below.

Figure 35:
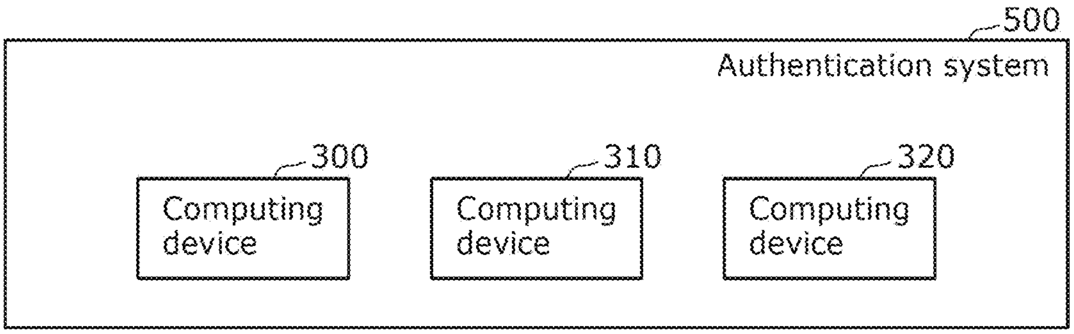
FIG. 35 is a block diagram illustrating the configuration of an authentication system according to an embodiment and multiple variations.

FIG. 35 is a block diagram illustrating a characteristic configuration of authentication system 500 according to the embodiment and multiple variations. As illustrated in FIG. 35, authentication system 500 includes computing devices 300, 310, and 320 that perform authentication processing on biometric information using a secure computation based on a secret sharing scheme. Although three computing devices 300, 310, and 320 are illustrated here, authentication system 500 may include two computing devices, or may include four or more computing devices.

Additionally, terminal device 100, provision device 200, and authentication device 400 need not be included in authentication system 500. The stated devices may be included in an external system, for example. Alternatively, any of computing devices 300, 310, and 320 may handle the roles of the stated devices.

Alternatively, if a feature value or the like of the user is registered in an initial state, terminal device 100 need not be present. In addition, if, in the initial state, the feature value learning model, the HashNet learning model, the threshold, and the like are applied in computing devices 300, 310, and 320, provision device 200 need not be present.

Alternatively, at least one of terminal device 100, provision device 200, and authentication device 400 illustrated in FIG. 1 may be added to authentication system 500 of FIG. 35.

Figure 36:
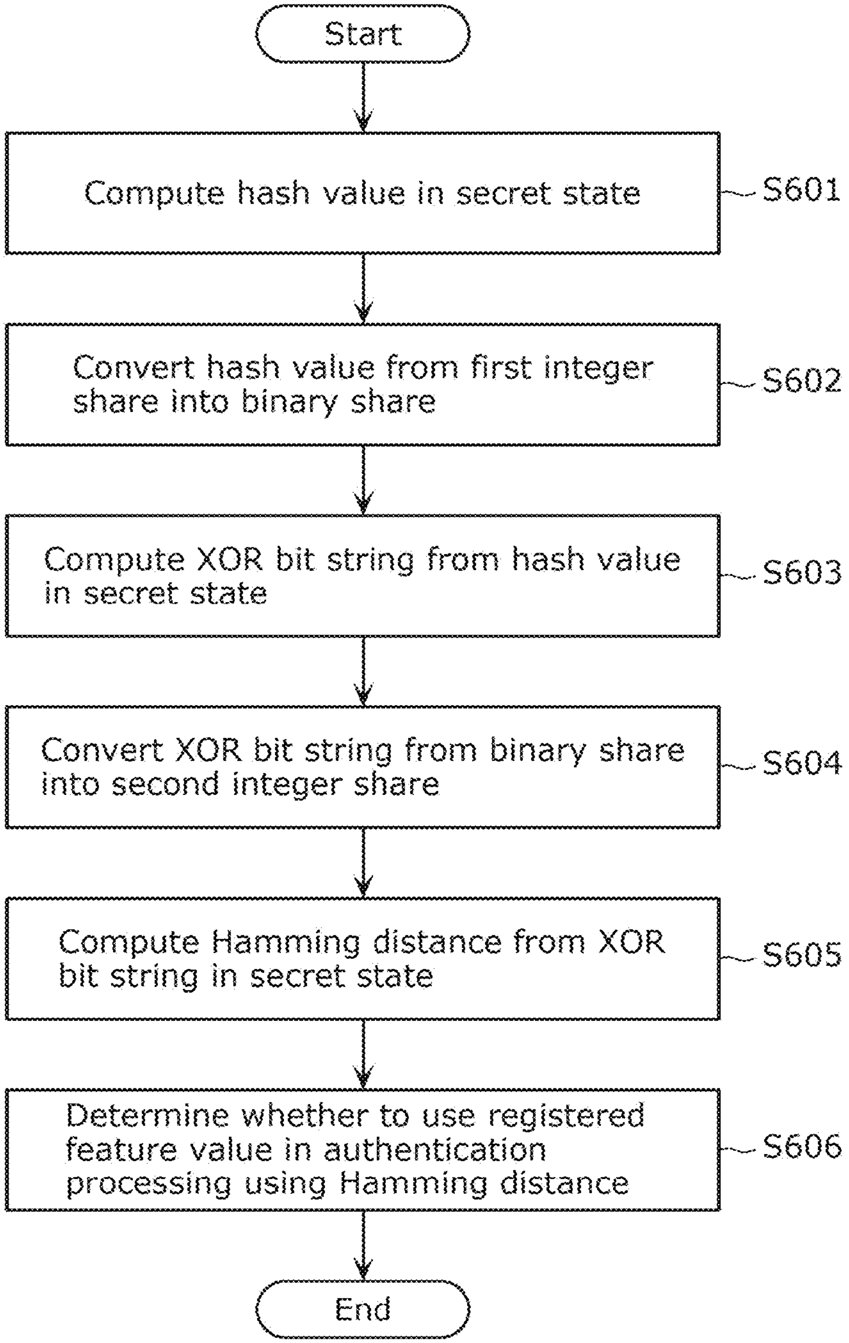
FIG. 36 is a flowchart illustrating operations by an authentication system according to an embodiment and multiple variations.

FIG. 36 is a flowchart illustrating characteristic operations by authentication system 500 according to the embodiment and multiple variations. Authentication system 500 includes computing devices 300, 310, and 320, as illustrated in FIG. 35. Authentication system 500 may further include authentication device 400 and the like. Authentication system 500 performs authentication processing on biometric information in a secret state using a secure computation based on a secret sharing scheme by performing the operations illustrated in FIG. 36.

First, computing devices 300, 310, and 320 of authentication system 500 compute, in a secret state, a hash value from a first feature value of the biometric information, using a hash function that preserves locality (S601). Next, in a secret state, computing devices 300, 310, and 320 convert the hash value from a first integer share, which is a share of secret distribution in which values are distributed using an integer of a first number of bits, to a binary share, which is a share of secret distribution in which values are distributed using a bit (S602).

Next, after the hash value is converted, computing devices 300, 310, and 320 compute an XOR bit sequence in a secret state by performing an exclusive OR operation between the hash value and a registered hash value (S603). Next, computing devices 300, 310, and 320 convert the XOR bit sequence from the binary share to a second integer share that is a share of secret sharing in which values are distributed using an integer of a second number of bits smaller than the first number of bits (S604).

Next, after the XOR bit sequence is converted, computing devices 300, 310, and 320 compute, in a secret state, a Hamming distance between the hash value and the registered hash value, by computing a total of a plurality of bit values present in the XOR bit sequence (S605). Computing devices 300, 310, and 320 then determine, using the Hamming distance, whether a registered feature value corresponding to the registered hash value is to be used in the authentication processing (S606).

This makes it possible to efficiently select registered feature value to be used in the authentication processing. Accordingly, the amount of computation performed in the authentication processing can be reduced. Furthermore, the XOR bit sequence can be computed efficiently using the binary share. Additionally, the total of the plurality of bit values in the XOR bit sequence can be efficiently computed and expressed using the second integer share corresponding to an integer of the second number of bits smaller than the first number of bits. This in turn makes it possible to accelerate the authentication processing.

For example, computing devices 300, 310, and 320 may determine that the registered feature value corresponding to the registered hash value is to be used in the authentication processing when the Hamming distance is included in the first M Hamming distances in ascending order among the N Hamming distances. This makes it possible to accurately select, as the registered feature value to be used in the authentication processing, the registered feature value corresponding to the registered hash value having a small Hamming distance with respect to the hash value to be processed.

Additionally, for example, computing devices 300, 310, and 320 may determine, when the registered feature value is to be used in the authentication processing, whether the authentication processing succeeds or fails using a similarity of the registered feature value to the first feature value or a second feature value obtained from the first feature value. This makes it possible to accurately determine the success or failure of the authentication processing of the biometric information using the similarity of the registered feature value to the first feature value or the second feature value of the biometric information.

Additionally, for example, computing devices 300, 310, and 320 may take the Hamming distance out of the secret state. Computing devices 300, 310, and 320 may then determine whether the registered feature value corresponding to the registered hash value is to be used in the authentication processing using the Hamming distance taken out of the secret state. This makes it possible to accelerate the processing using the Hamming distance. Accordingly, the processing of determining whether the registered feature value is to be used in the authentication processing using the Hamming distance can be accelerated.

Additionally, for example, computing devices 300, 310, and 320 may take the similarity out of the secret state. Computing devices 300, 310, and 320 may then determine whether the authentication processing succeeds or fails using the similarity taken out of the secret state. This makes it possible to accelerate the processing using the similarity. Accordingly, the processing of determining the success or failure of the authentication processing can be accelerated using the similarity.

Additionally, for example, the registered hash value may be registered after being converted from the first integer share to the binary share. This makes it possible to omit the processing of converting the registered hash value from the first integer share to the binary share in the authentication phase. This in turn makes it possible to accelerate the authentication processing.

Additionally, for example, authentication device 400 of authentication system 500 may distribute the biometric information using secret sharing. Computing devices 300, 310, and 320 may compute the first feature value to be used in the authentication processing from the biometric information in a secret state. This makes it possible to conceal the processing of computing the first feature value to be used in the authentication processing from the biometric information, and makes it possible to more reliably conceal the first feature value to be used in the authentication processing.

Additionally, for example, authentication device 400 of authentication system 500 may compute the first feature value to be used in the authentication processing from the biometric information. Authentication device 400 may then distribute the first feature value using secret sharing. This makes it possible to quickly compute the first feature value used in the authentication processing from the biometric information, with a secure computation based on the secret sharing scheme. This in turn makes it possible to accelerate the authentication processing.

Additionally, for example, authentication device 400 of authentication system 500 may compute the first feature value from the biometric information. Authentication device 400 may then distribute the first feature value using secret sharing. Computing devices 300, 310, and 320 of authentication system 500 may then compute a second feature value to be used in the authentication processing from the first feature value in a secret state.

This makes it possible to quickly compute the first feature value from the biometric information, without a secure computation based on the secret sharing scheme. This also makes it possible to conceal the processing of computing the second feature value to be used in the authentication processing from the first feature value, and makes it possible to more reliably conceal the second feature value to be used in the authentication processing.

Additionally, for example, computing devices 300, 310, and 320 may compute the similarity of the registered feature value to the first feature value or the second feature value, using an intermediate value computed from the registered feature value independent of the first feature value or the second feature value and registered.

Specifically, for example, computing devices 300, 310, and 320 may compute a similarity of the first feature value to the registered feature value, using an intermediate value computed from the registered feature value independent of the first feature value and registered. Alternatively, for example, computing devices 300, 310, and 320 may compute a similarity of the second feature value to the registered feature value, using an intermediate value computed from the registered feature value independent of the second feature value and registered.

This makes it possible to compute and register an intermediate value for computing the similarity before the authentication phase, and to compute the similarity in the authentication phase using the intermediate value that has already been computed and registered. This in turn makes it possible to accelerate the authentication processing.

In addition, for example, a device to which the biometric information is input in a registration phase of the biometric information may be the same as a device to which the biometric information is input in an authentication phase of the biometric information. This makes it possible to perform the authentication processing using the same device in the registration phase and the authentication phase. The configuration of the authentication system can therefore be simplified.

In addition, for example, the biometric information may be obtained from a medium in which the biometric information is recorded in a registration phase of the biometric information. This makes it possible to obtain the biometric information from a medium without obtaining the biometric information directly from a living subject. The registered hash value corresponding to the biometric information can therefore be prepared more flexibly.

Additionally, for example, the first integer share may be a share used for secret distribution of biometric information, a first feature value, a second feature value, or the like. The first number of bits may be a number of bits for expressing the first feature value, or may be greater than the number of bits of the hash value. The second integer share may be a share used for secret sharing of the Hamming distance. The second number of bits may be a number of bits for expressing a hash value. More specifically, the second number of bits may be equal to the number of bits of the hash value.

Aspects of an authentication system have been described thus far according to an embodiment, but the aspects of the authentication system are not limited to the embodiment. Variations that can be conceived of by one skilled in the art may be made on the embodiment, and a plurality of constituent elements in the embodiment may be combined as desired.

For example, processing executed by a specific constituent element in the embodiment may be executed by a different constituent element instead of the specific constituent element. Additionally, the order of multiple processes may be changed, and multiple processes may be executed in parallel. In addition, ordinals such as “first” and “second” used in the descriptions may be replaced, removed, or newly added as appropriate. These ordinals do not necessarily correspond to a meaningful order, and may be used to identify elements.

Additionally, an authentication method including steps performed by the constituent elements of the authentication system may be executed by any desired system or device. In other words, the authentication method may be executed by the authentication system described above, or may be executed by another system.

For example, some or all of the authentication method may be executed by a computer system including a processor, memory, input/output circuitry, and the like. At this time, the authentication method may be executed by having the computer system execute a program for causing the computer system to execute the authentication method.

For example, the program causes the computer system to execute an authentication method for an authentication system to perform authentication processing on biometric information in a secret state using a secure computation based on a secret sharing scheme. The authentication method includes: computing, in a secret state, a hash value from a first feature value of the biometric information, using a hash function that preserves locality; converting the hash value from a first integer share that is a share of secret sharing in which a value is distributed using an integer of a first number of bits, to a binary share that is a share of secret sharing in which a value is distributed using a bit; after the hash value is converted, computing, in a secret state, an XOR bit sequence by performing an exclusive OR operation between the hash value and a registered hash value; converting the XOR bit sequence from the binary share to a second integer share that is a share of secret sharing in which a value is distributed using an integer of a second number of bits smaller than the first number of bits; after the XOR bit sequence is converted, computing, in a secret state, a Hamming distance between the hash value and the registered hash value, by computing a total of a plurality of bit values present in the XOR bit sequence; and determining, using the Hamming distance, whether a registered feature value corresponding to the registered hash value is to be used in the authentication processing.

The program may be recorded in a non-transitory computer-readable recording medium such as a CD-ROM or the like.

Each constituent element in the plurality of devices of the authentication system may be constituted by dedicated hardware, by generic hardware that executes the above-described program and the like, or by a combination thereof. The generic hardware may be constituted by memory in which the program is recorded, a generic processor for reading out the program from the memory and executing the program, and the like. Here, the memory may be a semiconductor memory, a hard disk, or the like, and the generic processor may be a CPU or the like.

Additionally, the dedicated hardware may be constituted by memory, a dedicated processor, and the like. For example, the dedicated processor may execute the above-described authentication method by referring to the memory.

Additionally, each constituent element in the plurality of devices of the authentication system may be electrical circuitry. The electrical circuitry may constitute a single overall electrical circuit, or may be separate electrical circuits. Additionally, the electrical circuitry may correspond to dedicated hardware, or may correspond to generic hardware that executes the aforementioned program and the like.

INDUSTRIAL APPLICABILITY

The present disclosure can be used in an authentication method that performs authentication processing on biometric information using a secure computation based on a secret sharing scheme, and can be applied in biometric authentication systems and the like.

The invention claimed is:

1. An authentication method for an authentication system to perform authentication processing on biometric information in a secret state using a secure computation based on a secret sharing scheme, the authentication method comprising:

computing, in a secret state, a hash value from a first feature value of the biometric information, using a hash function that preserves locality;

converting the hash value from a first integer share that is a share of secret sharing in which a value is distributed using an integer of a first number of bits, to a binary share that is a share of secret sharing in which a value is distributed using a bit;

after the hash value is converted, computing, in a secret state, an XOR bit sequence by performing an exclusive OR operation between the hash value and a registered hash value;

converting the XOR bit sequence from the binary share to a second integer share that is a share of secret sharing in which a value is distributed using an integer of a second number of bits smaller than the first number of bits;

after the XOR bit sequence is converted, computing, in a secret state, a Hamming distance between the hash value and the registered hash value, by computing a total of a plurality of bit values present in the XOR bit sequence; and determining, using the Hamming distance, whether a registered feature value corresponding to the registered hash value is to be used in the authentication processing.

2. The authentication method according to claim 1, wherein the determining includes determining that the registered feature value corresponding to the registered hash value is to be used in the authentication processing when the Hamming distance between the hash value and the registered hash value is included in first M Hamming distances in ascending order among N Hamming distances, each of the N Hamming distances being between the hash value and a corresponding one of N registered hash values including the registered hash value.

3. The authentication method according to claim 1, further comprising:

determining, when the registered feature value is to be used in the authentication processing, whether the authentication processing succeeds or fails using a similarity of the registered feature value to the first feature value or a second feature value obtained from the first feature value.

4. The authentication method according to claim 1, further comprising:

taking the Hamming distance out of the secret state, wherein the determining includes determining whether the registered feature value corresponding to the registered hash value is to be used in the authentication processing using the Hamming distance taken out of the secret state.

5. The authentication method according to claim 3, further comprising:

taking the similarity out of the secret state, wherein the determining whether the authentication processing succeeds or fails includes determining whether the authentication processing succeeds or fails using the similarity taken out of the secret state.

6. The authentication method according to claim 1, wherein the registered hash value is registered having been converted from the first integer share to the binary share.

7. The authentication method according to claim 1, further comprising:

distributing the biometric information using secret sharing; and computing the first feature value to be used in the authentication processing from the biometric information, in a secret state.

8. The authentication method according to claim 1, further comprising:

computing the first feature value to be used in the authentication processing from the biometric information; and distributing the first feature value using secret sharing.

9. The authentication method according to claim 1, further comprising:

computing the first feature value from the biometric information;

distributing the first feature value using secret sharing; and computing a second feature value to be used in the authentication processing from the first feature value, in a secret state.

10. The authentication method according to claim 3, further comprising:

computing the similarity of the registered feature value to the first feature value or the second feature value, using an intermediate value computed from the registered feature value independent of the first feature value or the second feature value and registered.

11. The authentication method according to claim 1, wherein a device to which the biometric information is input in a registration phase of the biometric information and a device to which the biometric information is input in an authentication phase of the biometric information are a same device.

12. The authentication method according to claim 1, further comprising:

obtaining the biometric information from a medium in which the biometric information is recorded in a registration phase of the biometric information.

13. A non-transitory computer-readable recording medium having recorded thereon a program for causing a computer system to execute the authentication method according to claim 1.

14. An authentication system comprising:

a plurality of computing devices that perform authentication processing on biometric information in a secret state using a secure computation based on a secret sharing scheme, wherein the plurality of computing devices:

compute, in a secret state, a hash value from a first feature value of the biometric information, using a hash function that preserves locality;

convert the hash value from a first integer share that is a share of secret sharing in which a value is distributed using an integer of a first number of bits, to a binary share that is a share of secret sharing in which a value is distributed using a bit;

after the hash value is converted, compute, in a secret state, an XOR bit sequence by performing an exclusive OR operation between the hash value and a registered hash value;

convert the XOR bit sequence from the binary share to a second integer share that is a share of secret sharing in which a value is distributed using an integer of a second number of bits smaller than the first number of bits;

after the XOR bit sequence is converted, compute, in a secret state, a Hamming distance between the hash value and the registered hash value, by computing a total of a plurality of bit values present in the XOR bit sequence; and determine, using the Hamming distance, whether a registered feature value corresponding to the registered hash value is to be used in the authentication processing.

* * * * *